US006272428B1

(12) United States Patent
Heath et al.

(10) Patent No.: US 6,272,428 B1
(45) Date of Patent: Aug. 7, 2001

(54) METHOD AND SYSTEM FOR ENGINE IGNITION FOR TIMING CONTROLLED ON A PER CYLINDER BASIS

(75) Inventors: David Heath, Bowling Green, KY (US); Ronald D. Mackie, Pensacola, FL (US)

(73) Assignee: Holley Performance Products, Inc., Bowling Green, KY (US)

( * ) Notice: Subject to any disclaimer, the term of this patent is extended or adjusted under 35 U.S.C. 154(b) by 0 days.

(21) Appl. No.: 09/429,478

(22) Filed: Oct. 29, 1999

Related U.S. Application Data

(63) Continuation-in-part of application No. 09/209,933, filed on Oct. 30, 1998.

(60) Provisional application No. 60/063,934, filed on Oct. 31, 1997, provisional application No. 60/063,956, filed on Oct. 31, 1997, provisional application No. 60/063,962, filed on Oct. 31, 1997, provisional application No. 60/063,963, filed on Oct. 31, 1997, and provisional application No. 60/063,974, filed on Oct. 31, 1997.

(51) Int. Cl.[7] .................... G06F 19/00; F02P 5/15

(52) U.S. Cl. .................... 701/115; 123/406.6

(58) Field of Search .................... 701/115, 102, 701/114; 123/406.2, 406.24, 406.6, 406.63, 406.64, 406.65, 406.57; 324/382, 391, 392

(56) References Cited

U.S. PATENT DOCUMENTS

| | | |
|---|---|---|
| 3,926,165 | 12/1975 | Merrick . |
| 3,934,566 | 1/1976 | Ward . |
| 3,955,545 | 5/1976 | Priegel . |
| 4,034,733 | 7/1977 | Noguchi et al. . |

(List continued on next page.)

OTHER PUBLICATIONS

McFarland, Jim, "Performance Camshafts: Beyond the Basics," Hot Rod Magazine, 6 pages (11/98).

Bohacz, Ray T., "In and Out: Making Sense of cylinder–head flow testing," Hot Rod Magazine, pp. 66–80 (6/99).

Bohacz, Ray T., "10 things you always wanted to know about engines," Hot Rod Magazine, 6 pages (9/99).

McCoy, Charlie, "LS1 Mojo—The OBD–II Computer Gets Hacked," Hot Rod Magazine, 4 pages (2/99).

Bohacz, Ray T., "Mechanical Equilibrium—The Art of Engine Balancing," Hot Rod Magazine, pp. 83–94 (5/99).

"McFarland, Jim, Engine–Cycle Analysis," Hot Rod Magazine, 4 pages (4/98).

(List continued on next page.)

*Primary Examiner*—Tony M. Argenbright
*Assistant Examiner*—Hieu T. Vo
(74) *Attorney, Agent, or Firm*—Hunton & Williams

(57) ABSTRACT

An ignition system for energizing an ignition coil of an internal combustion engine. The system including a high voltage unit for energizing the ignition coil of the engine, a memory for storing system function indices and a processor. The processor receives a timing signal from an engine speed pick-up device, accesses the memory to retrieve the system function indices, and causes the high voltage unit to energize the ignition coil based on the system function indices and the frequency of the timing signal. System function indices data includes ignition timing curve data with a nominal or base curve and a plurality of adjustment timing curves for cylinder-specific timing calibration. The system also provides for optimal multiple sparking at low engine speeds by taking into consideration battery voltage and capacitor charge times. The system also includes a programmer in communication with the processor for allowing a user to instruct the processor to select and modify the system function indices during engine operation. The system also supports a programmable launch control feature for reducing traction loss during take-off.

24 Claims, 23 Drawing Sheets

U.S. PATENT DOCUMENTS

| | | | | |
|---|---|---|---|---|
| 4,046,125 | | 9/1977 | Mackie . | |
| 4,050,878 | | 9/1977 | Priegel . | |
| 4,052,967 | | 10/1977 | Colling et al. . | |
| 4,087,491 | | 5/1978 | Chapin . | |
| 4,089,215 | | 5/1978 | Chapin . | |
| 4,108,127 | | 8/1978 | Chapin et al. . | |
| 4,112,901 | | 9/1978 | Chapin et al. . | |
| 4,122,716 | | 10/1978 | Priegel . | |
| 4,131,100 | | 12/1978 | Merrick . | |
| 4,143,633 | | 3/1979 | Peck . | |
| 4,262,334 | | 4/1981 | Monpetit . | |
| 4,284,053 | | 8/1981 | Merrick . | |
| 4,324,217 | * | 4/1982 | Ina et al. | 123/406.63 |
| 4,326,493 | | 4/1982 | Merrick . | |
| 4,351,306 | * | 9/1982 | Luckman et al. | 123/609 |
| 4,378,769 | * | 4/1983 | Haubner et al. | 123/416 |
| 4,408,582 | | 10/1983 | Merrick . | |
| 4,408,583 | | 10/1983 | Merrick . | |
| 4,414,946 | * | 11/1983 | Daumer et al. | 123/417 |
| 4,424,784 | | 1/1984 | Miller . | |
| 4,426,979 | | 1/1984 | Tung . | |
| 4,467,763 | | 8/1984 | Gillespie et al. . | |
| 4,494,509 | * | 1/1985 | Long | 123/416 |
| 4,510,420 | | 4/1985 | Sasso . | |
| 4,538,573 | | 9/1985 | Merrick . | |
| 4,538,586 | | 9/1985 | Miller . | |
| 4,558,673 | | 12/1985 | Mackie . | |
| 4,575,809 | | 3/1986 | Sinniger et al. . | |
| 4,578,755 | | 3/1986 | Quinn et al. . | |
| 4,596,215 | | 6/1986 | Palesotti . | |
| 4,620,521 | | 11/1986 | Henderson et al. . | |
| 4,633,834 | | 1/1987 | Takeuchi et al. . | |
| 4,644,284 | | 2/1987 | Friedline et al. . | |
| 4,747,389 | * | 5/1988 | Yuzawa et al. | 123/643 |
| 4,869,132 | | 9/1989 | Clem . | |
| 5,004,984 | | 4/1991 | Becker et al. . | |
| 5,154,624 | | 10/1992 | Lemajeur et al. . | |
| 5,156,127 | * | 10/1992 | Ghaem | 123/426 |
| 5,168,842 | | 12/1992 | Brooks . | |
| 5,208,540 | | 5/1993 | Hoeflich . | |
| 5,293,317 | | 3/1994 | Adrian et al. . | |
| 5,315,982 | | 5/1994 | Ward et al. . | |
| 5,431,134 | | 7/1995 | Budde et al. . | |
| 5,526,785 | | 6/1996 | Masters . | |
| 5,531,206 | | 7/1996 | Kitson et al. . | |
| 5,535,620 | | 7/1996 | Nichols . | |
| 5,544,633 | * | 8/1996 | Mottier et al. | 123/630 |
| 5,644,491 | | 7/1997 | Fiske et al. . | |

OTHER PUBLICATIONS

"Magnante, Steve, Closed–loop TBI for hot–rodded engines," Hot Rod Magazine, 5 pages (12/98).

"MSD 7530 Fully Programmable Race Ignition", Product Features; Mar. 16, 1999; 18 pages.

"Basic Operation and Function of the MSD Pro Data Plus" 55 pages printout from web, undated.

HC916 Technical Summary—Motorola Literature Distribution, P.O. Box 20912, Phoenix, AZ 85036, Printed in USA in May 1996.

* cited by examiner

METHOD AND SYSTEM FOR ENGINE IGNITION FOR TIMING CONTROLLED ON A PER CYLINDER BASIS

RELATED APPLICATIONS

This application is a continuation-in-part of pending application Ser. No. 09/209,933, filed Oct. 30, 1998, which in turn claims the benefit of provisional patent Application Serial Nos. 60/063,934, 60/063,956, 60/063,962, 60/063,963 and 60/063,974, each provisional application having been filed on Oct. 31, 1997, the disclosures of which are herein incorporated by reference in their entities.

FIELD OF THE INVENTION

The present invention relates to an apparatus and method for a capacitive discharge digital ignition system for controlling combustion engine ignition, the system including a controller, a programmer, a high voltage unit, and means to program engine ignition timing values across the engine speed band, as well as other function parameters.

BACKGROUND

It is increasingly the case that cars and other vehicles with combustion engines employ digital rather than conventional analog ignition systems. A digital ignition system is preferable to an analog ignition system since a digital ignition system is generally not affected by temperature and humidity and, thus, provides more accurate and consistent engine performance. However, digital ignition systems heretofore, while accurate, have been of limited flexibility in terms of programmability and robustness. Such digital ignition systems have not allowed the user to take full advantage of a given engine's specific characteristics. Such digital ignition systems have not allowed the user to remotely program ignition parameters in a substantially real-time manner to optimize performance for the circumstances. These are significant disadvantages.

Additionally, each engine may have its own slightly different characteristics in terms of dimensions, composition, weight, flow characteristics, and so on. In layman's terms, each manufactured engine has its own idiosyncrasies. Existing digital ignition systems have not permitted the user to truly optimize performance because certain such idiosyncrasies are not accounted for. In a highly competitive environment, such as racing, this is a significant disadvantage because small improvements in performance can mean the difference in winning a race.

In high performance combustion engine applications, such as drag racing, a capacitive discharge ignition system is often preferred because a capacitive discharge ignition system is fast and efficient at providing energy for creating sparks, especially at high speeds. A capacitive discharge ignition system uses a storage, or "bathtub," capacitor to hold energy until the correct time to make the spark. The capacitor is connected to an ignition coil of the engine through a switch such that, to generate a spark, the switch is activated to dump the charge from the capacitor to a primary side of the ignition coil in less than $1/10^{th}$ of a millionth of a second. The voltage applied to the ignition coil as a result of the capacitor discharge is then stepped up by the turns ratio of the ignition coil and applied to spark plugs of the engine for igniting fuel within combustion chambers of the engine.

A significant benefit of this approach is that the capacitor can be charged extremely fast and can hold energy for extended periods with almost no loss or leakage. It can then can release the energy to the ignition coil very quickly. Thus, a capacitive discharge ignition system provides an extremely fast and efficient method of storing and distributing energy to create sparks in an engine, with little or no drop-off in engine performance at high speeds.

However, as is often the case in engineering tradeoffs, there are disadvantages that flow from the use of capacitive discharge ignition systems. For example, the quicker, hotter sparks of a capacitive discharge ignition system results in a shorter duration for each spark, which can disrupt engine performance at low speeds. At high engine speeds, a shorter duration spark is not a problem since the spark is supposed to occur very quickly. But at low engine speeds, the shorter duration sparks can result in poor performance because cylinder pressures and temperatures are low and air/fuel mixtures can be less than optimal. This is a significant disadvantage. There are other challenges presented to the use of a digital ignition system using a capacitive discharge mechanism.

A capacitive discharge engine will preferably also include an engine speed, or "rev limiter" feature to protect the engine from dangerous high speeds, or "over-revving," where the engine could be damaged or even explode. A rev limiter feature turns off the spark to individual cylinders of the engine when engine speed exceeds a preset maximum level. Thus, the engine is purposely caused to misfire so that the engine speed is brought back down to the preset maximum level. Existing implementations of rev limiters have not provided optimum flexibility and programmability to allow the user to readily optimize rev limiting to circumstances. This is a significant drawback.

Another difficulty often encountered in high-performance applications, such as racing, is the tendency of the user to provide too much torque to the wheels upon launch. Often the wheels lose traction and precious time is lost as a result. This can be the difference between winning and losing a race. This is a significant drawback.

Other problems and drawbacks also exist.

SUMMARY OF THE INVENTION

Accordingly, one object of the present invention is to overcome one or more of the aforementioned and other limitations of existing systems and methods for digital ignition systems.

It is another object to provide a capacitive discharge digital ignition system with a controller and programmer for changing values stored in the controller for substantially immediate effect.

It is another object to provide such a system whereby the programmer can be used to program engine timing curves, rev limiters, retard values, engine speed and/or time activated switches, and other such engine functions, in order to optimize performance for an engine's characteristics and/or for particular applications, such as racing.

It is a further object to provide such a system and method where stored timing curve data is provided on a cylinder-specific basis, thereby optimizing performance.

It is a further object to provide such a system and method where cylinder-specific timing curve data is dynamically adapted based on control loop data to effectively self-tune an engine.

It is another object of the present invention to provide satisfactory performance over the engine speed band using the capacitive discharge ignition in a manner that considers available electrical energy and charging or discharge times to tailor multiple sparking or "restrikes" at low engine speeds.

It is yet another object of the invention to provide a so-called launch control function which retards engine timing for a period after launch to reduce traction loss.

Accordingly, the present disclosure relates, in general, to a system for controlling ignition timing in an internal combustion engine. The digital ignition system of the present invention utilizes a controller, including a central processor unit and memory, for controlling system functions such as restrikes, rev limiters, engine speed and/or timing activated switches, spark duration, and ignition timing. Furthermore, the features of the present ignition system, such as restrikes, rev limiters, engine speed and/or timing activated switches, spark timing retards and timing curves, will preferably be provided in an integrated package such that add-on boxes and other additional components are not necessary and do not have to be added to the ignition system once installed in a vehicle. Furthermore, the features are programmable, including programmability of ignition timing curves on a per-cylinder basis to optimize performance to an engine's particular characteristics.

The preferred capacitive discharge digital ignition system includes means for instantaneously, and remotely, programming system functions values. By instantaneously and remotely, it is meant that the ignition system should allow a user to be seated in a driver's compartment of a vehicle incorporating the ignition system, while the vehicle is positioned at a starting line at the beginning of a race, with the engine either running or turned off, to instantaneously change system parameters so as to optimize performance for the setting.

Accordingly, the digital ignition system disclosed herein provides for energizing an ignition coil of an internal combustion engine. A high voltage unit energizes the ignition coil of the engine, a memory stores system function indices, and a processor controls operations. The processor receives a timing signal from an engine speed pick-up device, accesses the memory to retrieve the system function indices, and causes the high voltage unit to energize the ignition coil based on the system function indices and the frequency of the timing signal. The system also includes a programmer in communication with the processor for allowing a user to instruct the processor to select and modify the system function indices during engine operation. In addition to or instead of the programmer, the system may include an input device having a microcontroller for converting user inputs into a value for a system function index, communicating the value to the processor, and then instructing the processor to insert the value into the system function index.

A process for changing values stored in function indices within an ignition system controller in response to user inputs through a remote programmer having function, value and scroll switches and a display is also disclosed. The function indices are accessed by the ignition system to execute the various programmable functions discussed herein, such as calculating ignition timing and implementing the rev limiters, misfire sequence patterns, RPM switch activation/deactivation, number of cylinders/strokes, and so forth. The process includes monitoring the function and the value switches of the programmer, displaying a function code if the function switch is selected, displaying a different function code if the scroll switch is selected, displaying a value for a last displayed function code if the value switch is selected, and displaying a different value for the last displayed function code if the scroll switch is selected. The process also includes saving a last displayed value of the last displayed function code into a random access memory location of the controller. The last displayed value of the last displayed function code is then saved in a system function index corresponding to the last displayed function code if the function switch is selected. The system function index is located within programmable read-only memory of the microprocessor accessed by the ignition system to calculate ignition timing.

Another process for changing values stored in function indices within an ignition system controller in response to user inputs through an input device having a switch and first and second indicators is disclosed. The function indices are accessed by the system to control the various aspects of ignition, such as timing, rev limiting, misfire patterns, etc. The process includes scanning the switch, accessing an index of a random access memory to retrieve an old value of the switch stored in the index of the random access memory, comparing a scanned value of the switch to the old value of the switch, turning on the first indicator if the scanned value and the old value are not equal, and causing the scanned value to be stored in the system function index of the programmable read only memory. The process also includes replacing the old value with the scanned value of the switch in the index of the random access memory, and turning on the second indicator and turning off the first indicator.

Another process is disclosed for programming a capacitive discharge digital ignition system on a per-cylinder basis. In the preferred embodiment, this is in a distributor-based environment where a distributor ultimately routes the properly-timed spark from the coil to the proper cylinder. System function indices for a base timing curve as a function of degree advance and engine speed are provided. A plurality of cylinder-specific adjustment curves ("trim" curves) are provided as a function of engine speed to adjust the base timing curve for each cylinder. The user can then program the adjustment curves on a per-cylinder basis to improve performance. In one embodiment, the adjustment curves may be fixed in memory once programmed. In another embodiment, the adjustment curves may be dynamically developed by the controller based on a control loop with feedback to optimize measured performance parameters.

A process for dynamic resparking is also provided which optimizes low engine speed resparking by considering such factors as battery voltage and capacitor charge time. A process is also provided for a launch control feature which retards out-of-the-block timing to reduce traction loss.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

So that those having ordinary skill in the art to which this disclosure appertains will more readily understand how to construct an ignition system in accordance with this disclosure, the ignition system will be described in detail hereinbelow with reference to the drawings wherein.

DETAILED DESCRIPTION OF THE INVENTION

Figure 1:
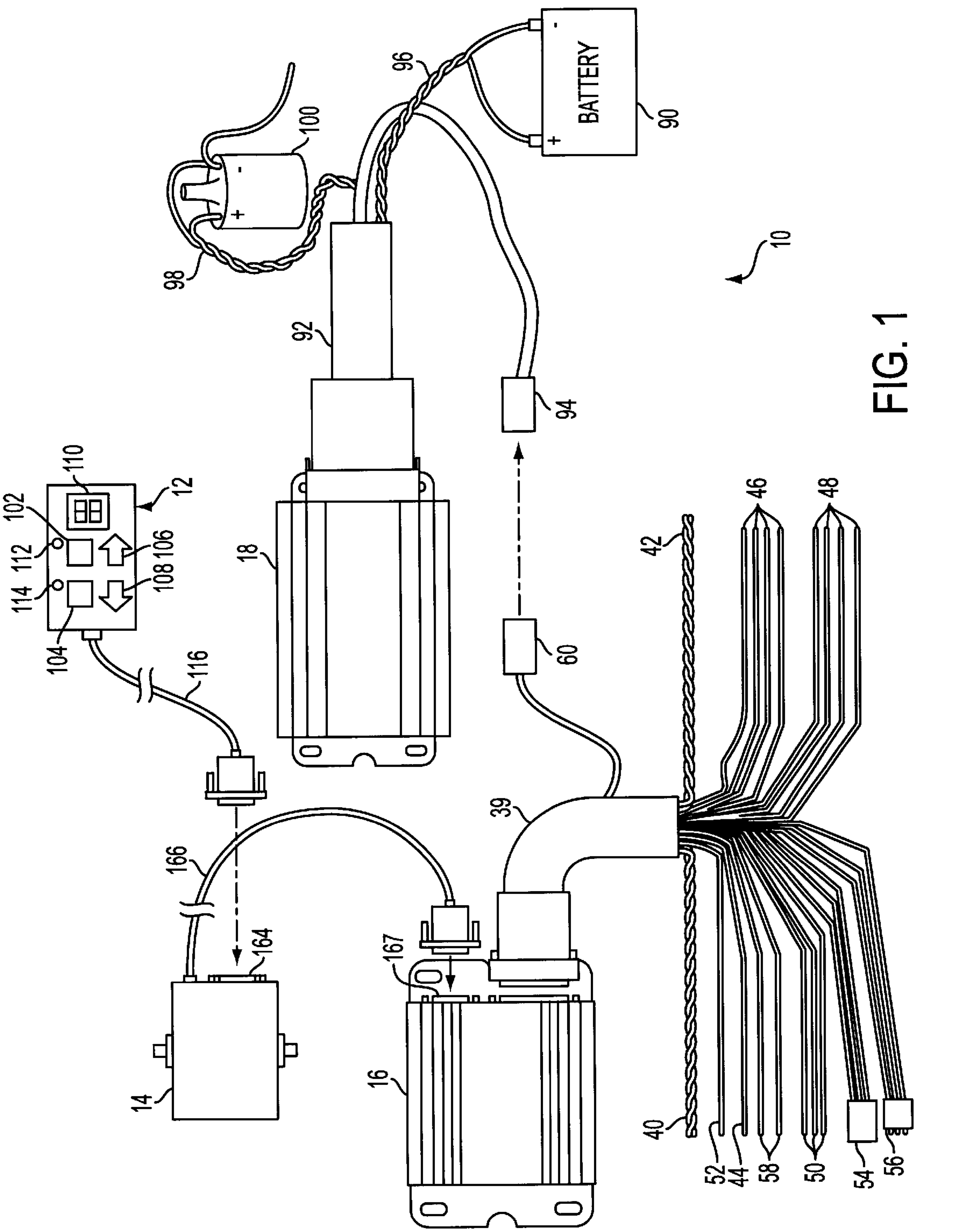
FIG. 1 shows a top plan view of the presently disclosed ignition system.

Referring to FIG. 1, an ignition system 10 according to the present disclosure is shown. In general, the system is a fully integrated, digital, high-performance, multi-spark, capacitive discharge ignition system, wherein system default values used to calculate ignition timing can be changed through a remote programmer 12 and/or a "starting line" rev limiter input device 14.

The presently disclosed ignition system 10 includes, in addition to the remote programmer 12 and the rev limiter input device 14, a control module 16 and high voltage unit 18. The ignition system 10 provides a plurality of integrated features, most of which are user-programmable.

System Features

Features of the presently disclosed ignition system 10 include: multiple sparking at low engine speeds; main, staging, burnout and auxiliary engine speed limiters ("rev limiters") having user-programmable values; a choice of multiple misfire patterns for each of the rev limiters; user-programmable timing retards; user-programmable engine speed and/or time activated switches ("RPM switches"); a user-programmable timing curve; user-programmable trim data for cylinder-specific timing adjustment; a tachometer output; and user-programmable options for various engine configuration parameters, including the number of cylinders, the number of cycles, the boost retard, and the input trigger (type and location). These features are controlled by a microcontroller 20 (FIG. 2), and user-programmable values associated with the features are quickly and easily changed via the programmer 12 and/or the rev limiter input device 14. All features are described in detail in the 1998 Holley® Performance Products Catalog available from Holley Performance Products of Bowling Green, Ky., which is incorporated herein by reference.

Regarding sequential misfire patterns, the preferred embodiment supports a plurality of programmable misfire patterns. Generally, the available number of misfire patterns is a function of the number of cylinders whereby a misfire pattern that is an even multiple of the number of cylinders is unavailable. Thus, a user may program a V8 engine may select the random misfire sequence or one of the following sequential patterns: 1 of 2, 1 of 3, 1 of 5, 1 of 7, 1 of 9, and 1 of 11.

As is known, multiple sparks in a capacitive discharge ignition system are necessary at lower engine speeds in high performance engines, to produce longer overall spark duration. The present ignition system 10 provides multiple sparks at low engine speeds, i.e., preferably below 3,000 revolutions per minute (rpm). Once above 3,000 rpm, however, the ignition system generally provides one spark per cylinder per crankshaft revolution. In a first embodiment, the multiple sparking at low engine speed feature of the presently disclosed system 10 is automatic and not user-programmable. U.S. Pat. Nos. 4,046,125 and 4,558,573 to Mackie (an inventor of the present ignition system) disclose capacitive discharge ignition systems that provide multiple sparks at lower engine speeds, and are herein incorporated by reference in their entireties. In another embodiment, multiple sparking is automated and further optimized by considering factors such as available electrical energy (battery voltage) and capacitor charge/discharge times. In yet another embodiment, aspects of the multiple sparking feature, such as the engine speed cut-in, may be user programmable.

The rev limiting feature is used to prevent engine damage by limiting the engine to a programmable maximum speed such that the engine does not "over rev". The main, burnout, staging, and auxiliary rev limiters have user-programmable over rev values. In addition, the burnout, staging, and auxiliary rev limiters are activated or enabled by external switches, such as a line lock, trans brake, delay box or timer. When the over rev value for any of the rev limiter is reached, and if the rev limiter has been enabled by an external switch, the microcontroller 20 prevents sparking in some of the cylinders, purposely causing the engine to misfire and thereby preventing engine speed from rising above the over rev value. For each of the four different rev limiters, the microncontroller 20 can be programmed for a random or a sequential misfire pattern. In the preferred embodiment, there is a plurality of sequential misfire patterns which can be programmably selected.

The timing retard feature retards ignition timing to improve engine performance. In a first embodiment, the system 10 includes four timing retards R1–R4, each user-programmable from 0–20° spark timing in 1° increments, and enabled by remote switches. In a second embodiment providing greater retard precision, system 10 permits each of the four timing retards to be user-programmable up to 9.9 degrees in 0.1 degree increments. These remote switches may be programmed to enable/disable timing based on engine speed or time activation.

The system 10 also has a boost retard feature which can be turned on or off by a user through the programmer 12. In a first embodiment, when on the boost retard feature will add 1° of timing retard for each PSI (pound per square inch) of boost pressure detected in a manifold of the engine. The use of the boost retard feature requires a manifold pressure ("MAP") sensor, which the system is pre-wired for. In a second embodiment, the boost retard feature is fully programmable to adjust the retard between 0 and 5.0 degrees per PSI of boost in 0.1 degree increments. This second embodiment may further support a programmable limit on the maximum amount of boost allowed.

The RPM switches L1–L3 and H4 are activated at user-programmable engine speeds for turning on or controlling remote functions, auxiliary engine components, accessories or indicators, such as a shift light or an air shifter. The RPM switches may be programmed to enable features such as the timing retard feature using switching logic based on engine speed and/or time windows. The default switching logic, or first "switching function," (U1) for the RPM switches is based on a cut-in engine speed and a cut-out engine speed. In that case, an "activation" engine speed for each switch is user-programmable preferably from 0 rpm to 16,000 rpm in 100 rpm increments. The switch is activated when the engine reaches the user programmed activation speed. A "deactivation" engine speed for each switch is also user-programmable preferably from 0 rpm to 16,000 rpm in 100 rpm increments, such that the switch will be deactivated when engine speed falls below the user selected deactivation speed. In the preferred embodiment, four RPM switches are provided, three which enable or activate by closing the circuit to ground (L1–L3) and a fourth (H4) which enables or activates by connecting to power.

Other user-selectable switching functions (U2–U4) are available for programming the RPM switches. A second switching function (U2) provides rpm-based activation with timer-based deactivation. The RPM switch output (i.e., ground or power) is enabled upon reaching the programmed engine speed. This also starts the timer. When the timer value is reached, the switch is disabled. A third programmable switching function (U3) uses a window of activation, and provides window constraints, delayed activation, external enable and abort. When the enable line is toggled, the first timer is activated. If the rpm is within the programmed window (above the cut-in rpm and below the cut-out rpm), then when the timer reaches the programmed value the RPM switch output will be activated. If the rpm is outside the window when the timer reaches its value, and the abort is off, the output will activate when the rpm enters the window. If the abort is on, and the rpm is outside the window when the timer reaches its value, the output will not activate even if the rpm enters the window at some other time.

A fourth programmable switching function (U4) provides that when the enable line is activated a first timer is started. After the first timer reaches its programmed value, the switch output is activated and a second timer is started. The output is deactivated when the second timer reaches its programmed value. If the abort is off and the rpm is outside the window when the first timer reaches its programmed value, the output will not be activated and the second timer will not start. If the rpm falls back within the window, the switch output will be activated and the second timer started. If the abort is on and the rpm is outside the window when the first timer reaches the programmed value, the output will never activate and the second timer will never be started.

It should also be noted that the switching functions can be inverted so that an RPM switch can operate in the opposing manner. In the case of the first switching function, the switch would be disabled upon exceeding the higher rpm and enabled when falling below the lower rpm.

The present ignition system 10 also includes a user-programmable timing curve, wherein the exact amount of timing advance or retard can be programmed at each of a plurality of timing points. For example, the system preferably allows a 32 point timing curve from zero to fifty degrees (in one degree increments) from 500 rpm to 16,000 rpm (in 500 rpm increments). A user, therefore, is quickly and easily allowed to create an infinite number of timing curves using the remote programmer 12. In addition, the system automatically provides a linear connection or interpolation between adjacent points.

Additionally, as discussed further below, the system provides a user programmable cylinder-specific timing curve capability by providing a nominal "base timing curve" and an "adjustment timing curve" for each cylinder. This allows optimization of performance based on the specific engine characteristics.

Control Module and High Voltage Unit

Figure 2:
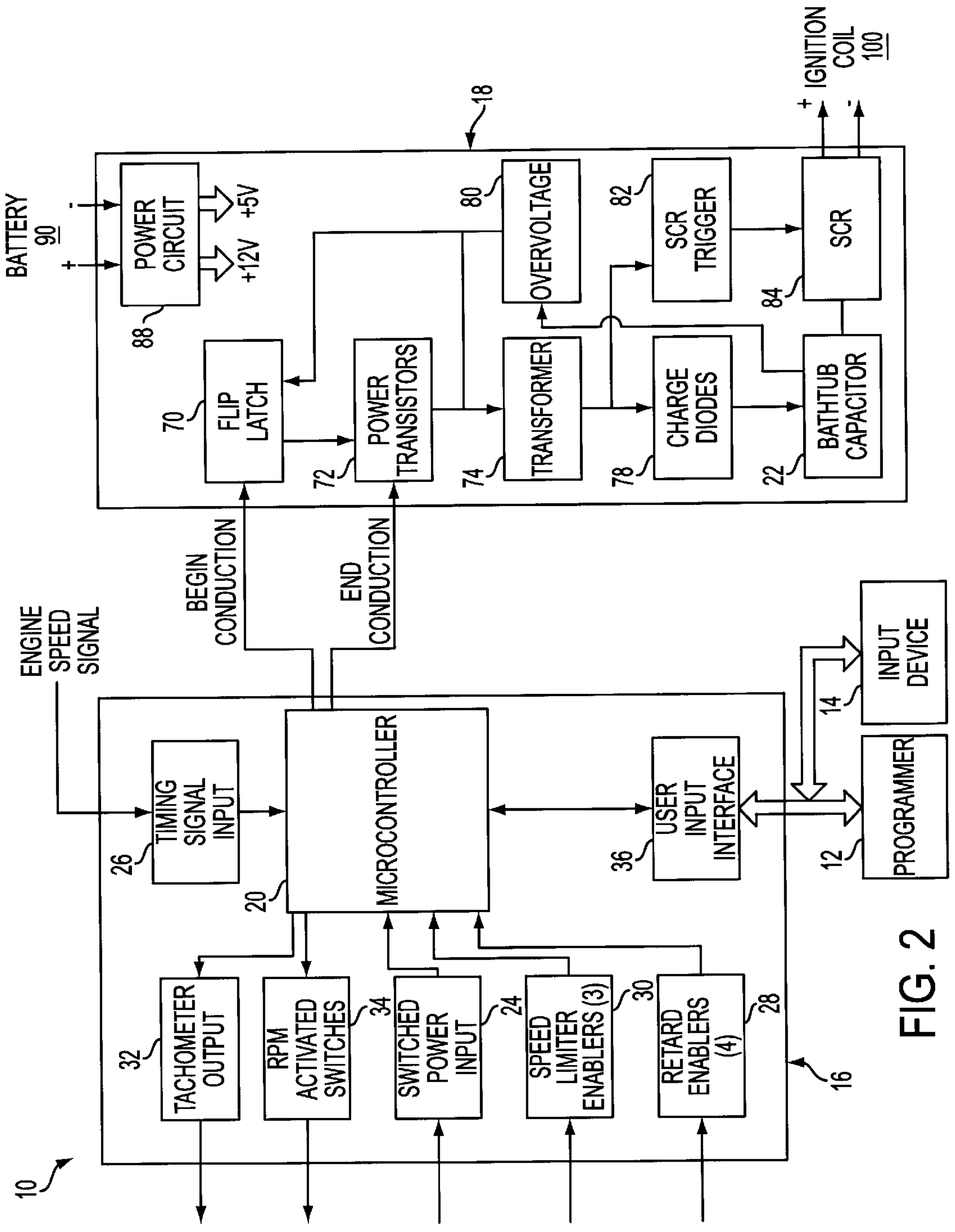
FIG. 2 shows a hardware block diagram of a control module and a high voltage module of the ignition system of FIG. 1.
Figure 3:
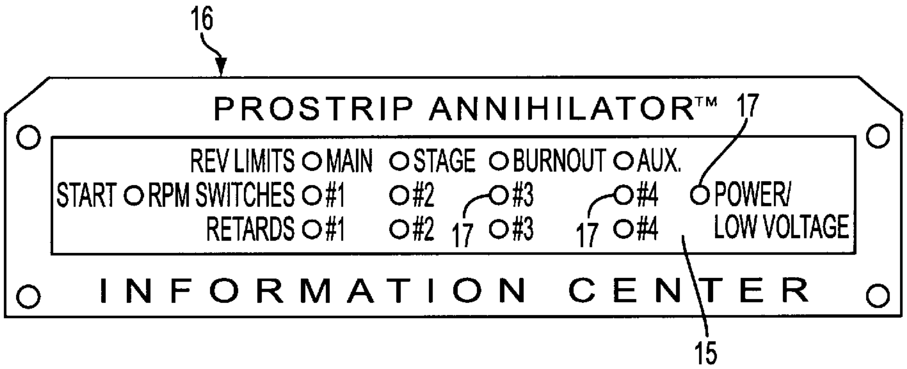
FIG. 3 shows a front elevation view of the control module of the ignition system of FIG. 1.

Referring in particular to FIGS. 1 through 3, the control module 16 incorporates the microcontroller 20, which has a processor and a memory, while the high voltage unit 18 incorporates power output circuitry including a storage, or "bathtub" capacitor 22. The control module 16 utilizes a timing signal generated by an engine speed indicator device, such as a magnetic reluctor, Hall Effects sensor, or breaker points of the engine, and instructs the high voltage unit 18 when to discharge the capacitor through ignition coil 100 to the spark plugs of the internal combustion engine. The ignition system 10 disclosed can be used with a number of different types of ignition coils. However, the system is preferably used with a Lasershot™ brand ignition coil available from Holley Performance Products of Bowling Green, Ky.

The control module 16 also includes input, output and interface circuits extending from the microcontroller 20. The circuits include: a switched power input circuit 24, timing signal input circuits 26, retard enabling circuits 28, and rev limiter enabling circuits 30. The output circuits include: a tachometer output circuit 32 and RPM activated switch output circuits 34. The interface circuits include programmer interface circuits 36, which allows the control module 16 to communicate with the remote programmer 12 and/or the starting line input device 14.

The microcontroller 20 monitors the frequency of the engine timing signal and instructs the high voltage unit 18 when to energize the ignition coil 100 based upon user inputs (through the remote programmer 12, the starting line input device 14 and the enabling switches) and a system program code. Although not shown, the microcontroller 20 includes an analog to digital (A/D) converter, a central processing unit (CPU), electronically erasable programmable read only memory (EEPROM) and static random access memory (SRAM). The microcontroller 20 may comprise a Motorola MC68HC711E9 microcontroller 20 running at 8 MHz, for example. A detailed understanding of components and operating code for the Motorola MC68HC711E9 microcontroller can be found in Technical Summary HC711 or the HC11 M68HC11 E Series Technical Data manual (1993), both of which are available from Motorola Corporation, Motorola Literature Distribution, Phoenix, Ariz., and which are incorporated herein by reference.

The microcontroller 20 includes program code instructing the processor to communicate with the remote programmer 12 and/or the input device 14, and uses the resulting user inputs with the engine timing signal to calculate the proper time for energizing the ignition coil 100. The program code for the presently disclosed ignition system is contained in U.S. Provisional patent Application Serial No. 60/063,963, which has been incorporated herein by reference.

Referring to FIG. 1, the control module 16 includes a wiring harness 39. The harness includes: wires 40 for connection to an on/off power switch; wires 42 for connection to a magnetic input from a distributor, i.e., engine timing signal; wires 44 for connection to a remote tachometer; wires 46 for connection to auxiliary vehicle components controlled by the RPM activated sensors; wires 48 for connection to retard enabling switches; wires 50 for connection to rev limiter enabling switches; wires 52 for connection to HEI/points; wires 54 for connection to a Hall Effects sensor; wires 56 for connection to a MAP sensor; wires 58 for connection to temperature or oil pressure sensors for an alarm circuit and an emergency kill circuit of the control module 16; and wires 60 for connection to a wiring harness 92 of the high voltage unit 18. A preferred Hall Effects sensor is disclosed in U.S. Provisional Patent Application Serial No. 60/063,934, which has been incorporated herein by reference.

Although not shown in the block diagram of FIG. 2, the control module 16 also includes a MAP sensor input circuit, a HEI/points input circuit, an alarm input circuit, an emergency kill input circuit, and a Hall Effects sensor input circuit. An electrical schematic of the control module 16 is contained in commonly owned U.S. Provisional Patent Application Serial No. 60/063,963, the disclosure of which has been incorporated herein by reference. As shown in FIG. 3, the control module 16 includes a display board 15 having a plurality of LED indicators 17 for indicating when the system 10 is executing the various functions, such as the rev limiters, RPM switches and timing retards.

Figure 11A:
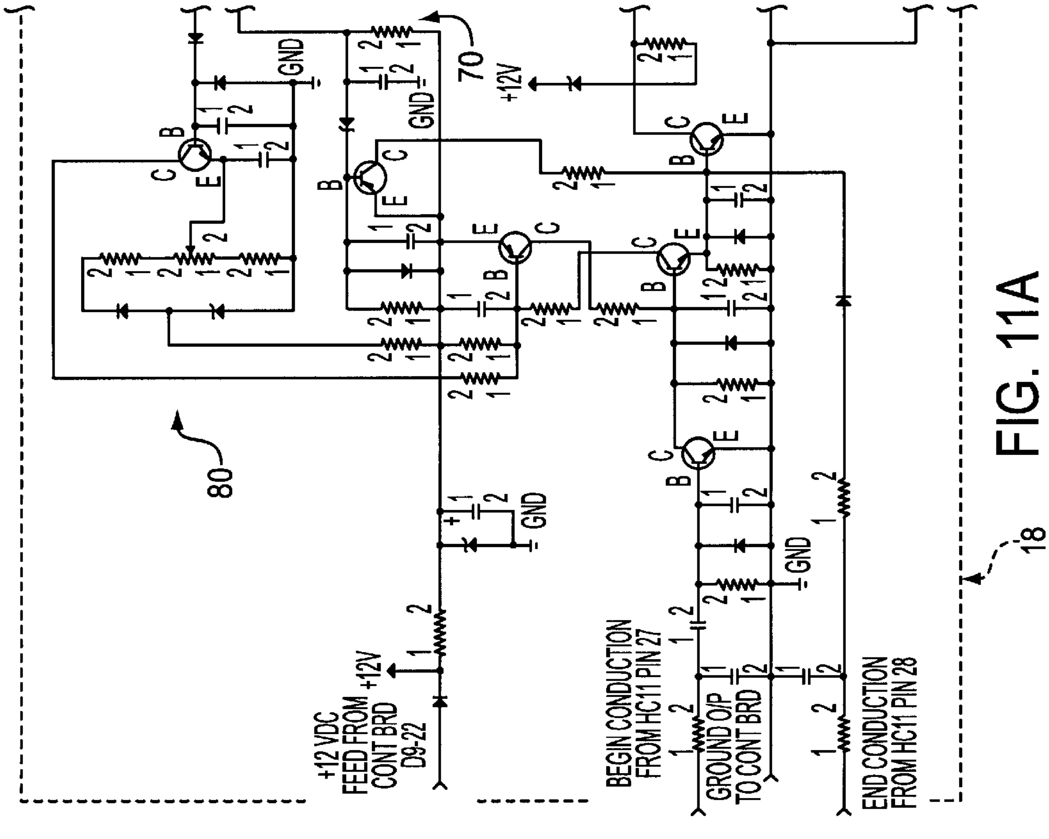
FIG. 11 shows an electrical schematic of the high voltage module of the ignition system of FIG. 1.
Figure 11B:
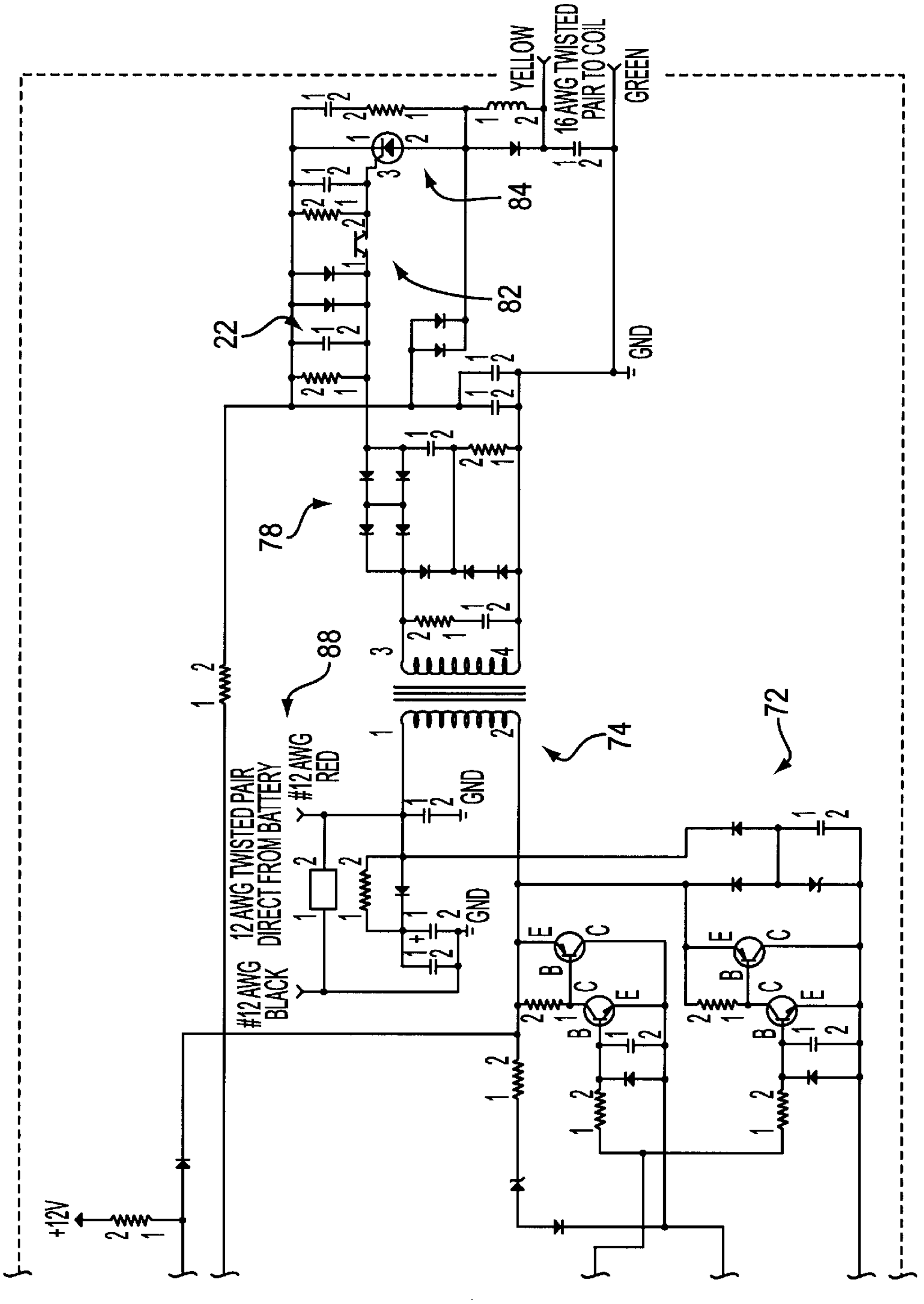

Referring to FIGS. 1, 2 and 11, the high voltage unit 18 includes a flip latch circuit 70 that turns on a power transistor circuit 72 whenever the flip latch receives a "begin conduction" control signal from the microcontroller 20. When the power transistors 72 are turned on, current is pulled through a primary side of a power transformer 74 and voltage begins to increase across the transformer. Once a sufficient amount of current has been stored on the primary side of the transformer 74, the flip latch 70 turns off the transistors 72 such that current flow stops. The sudden collapse of the current flow through the primary of the transformer 74 transfers the stored energy to a secondary side of the transformer and charges the "bathtub" capacitor 22 through charge diodes 78.

The voltage stored on the capacitor 22 is maintained until the next engine timing signal occurs (e.g., see block 26, FIG. 2) or enough time has elapsed for the voltage to leak off through an overvoltage circuit 80. The overvoltage circuit 80 is used to prevent tremendous buildups of energy on the bathtub capacitor 22 in the event the ignition coil 100 is disconnected during operation. In addition, the overvoltage circuit 80 causes the flip latch 70 to turn off the transistors 72 in the event the voltage across the bathtub capacitor 22 exceeds an unsafe level.

When the transistors 72 are turned on again by the flip latch 70, in response to the next control signal from the microcontroller 20, a short voltage pulse is reflected across the transformer 74 and enables a trigger circuit 82, which triggers a silicon controlled rectifier ("SCR") 84, so that the previously stored energy on the bathtub capacitor 22 is gated out to the ignition coil 100 of the motor. In the preferred embodiment, the aforementioned next control signal also corresponds to the begin conduction control signal for the charge that will be developed/stored for the next spark sequence. It should also be noted that this control signal which causes the release of the previously developed charge to the ignition coil is generated based on the stored timing curve data further discussed herein.

Thus, the flip latch 70 normally produces a single charge per engine timing signal to the ignition coil 100 such the ignition coil provides voltage for a single spark. The microcontroller 20 produces additional sparks, i.e., restrikes, by signaling the flip latch circuit 70 multiple times between engine timing signals, and prevents sparking, e.g., for rev limiting, by turning off the transistors 72 through an end conduction signal which disables power transistors 72.

The high voltage unit 18 also includes a power circuit 88 which connects to a vehicle battery 90, and distributes power to the transformer 74, through the high voltage unit 18 to the control module 16 and, through the control module 16 to the user input device 14 and the remote programmer 12. The wiring harness 92 of the high voltage unit 18 includes wires 94 for connection to the wiring harness 39 of the control module 16, wires 96 for connection to the vehicle battery 90, and wires 98 for connection to the vehicle ignition coil 100.

Remote Programmer

Figure 4:
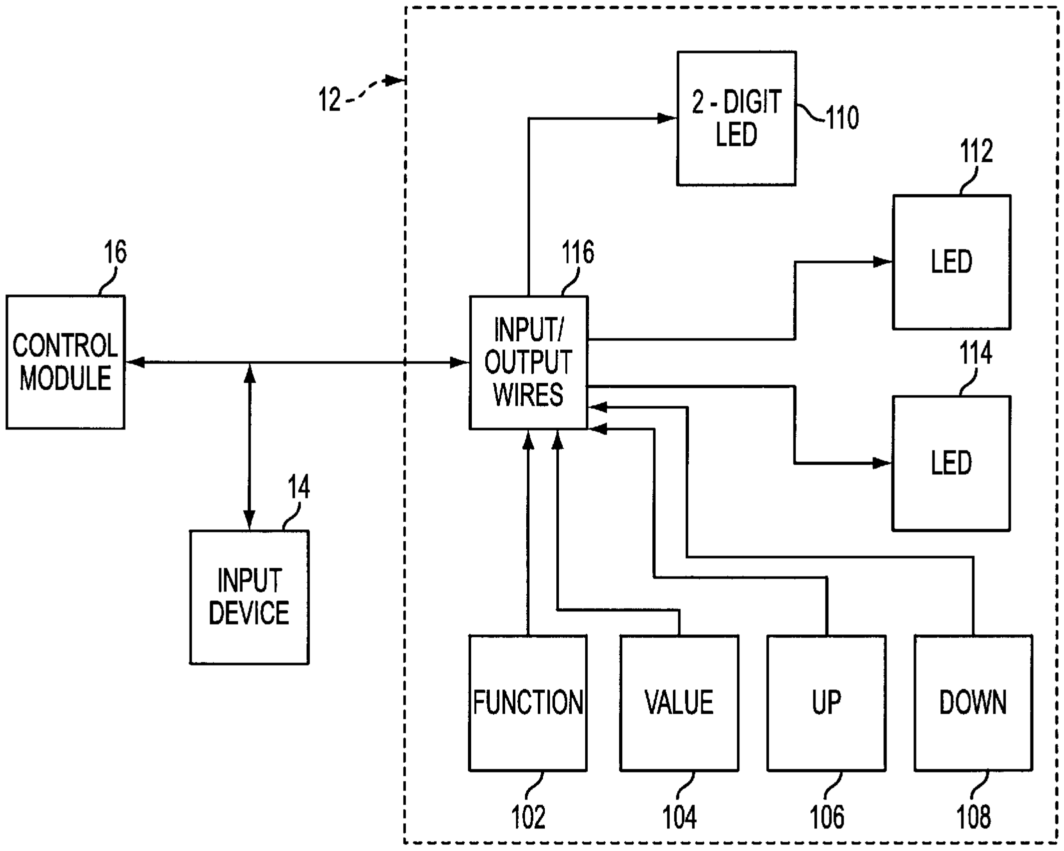
FIG. 4 shows a hardware diagram of a remote programmer of the ignition system of FIG. 1.

Referring to FIGS. 1 and 4, the remote programmer 12 operates as an interface between the user and the control module 16 to facilitate changes to system function values. The programmer 12 allows the user to access and change system function values stored in the EEPROM of the microcontroller 20 of the control module 16. The programmer 12 has a function, a value and at least one scroll switch. Preferably, the programmer 12 has a membrane switch overlay with four switches 102, 104, 106, 108 corresponding to "FUNCTION", "VALUE", "UP" and "DOWN". The overlay also has a red/transparent window through which a two digit LED display 110 may be viewed. Two LED indicators 112, 114 corresponding to the FUNCTION and the VALUE switches 102, 104 are also provided, preferably in different colors.

The FUNCTION switch 102 allows access to memory indices of the EEPROM corresponding to different system functions, and the VALUE switch 104 allows access to memory locations contained within the various indices themselves, wherein the memory locations correspond to different possible values for each system function. The UP and DOWN switches 106, 108 allow a user to scroll between the indices when in the FUNCTION mode, or the indices' discrete memory locations when in the VALUE mode.

The programmer 12 is adapted to communicate with the microcontroller 20. In particular, the various inputs and outputs of the programmer 12 are routed to the control module 16 via a cable 116. Power is supplied to the programmer 12 from the control module 16 via the cable 116. An electrical schematic of the programmer 12 is contained in commonly owned U.S. Provisional Patent Application Serial No. 60/063,963, the disclosure of which has been incorporated herein by reference.

Figure 5:
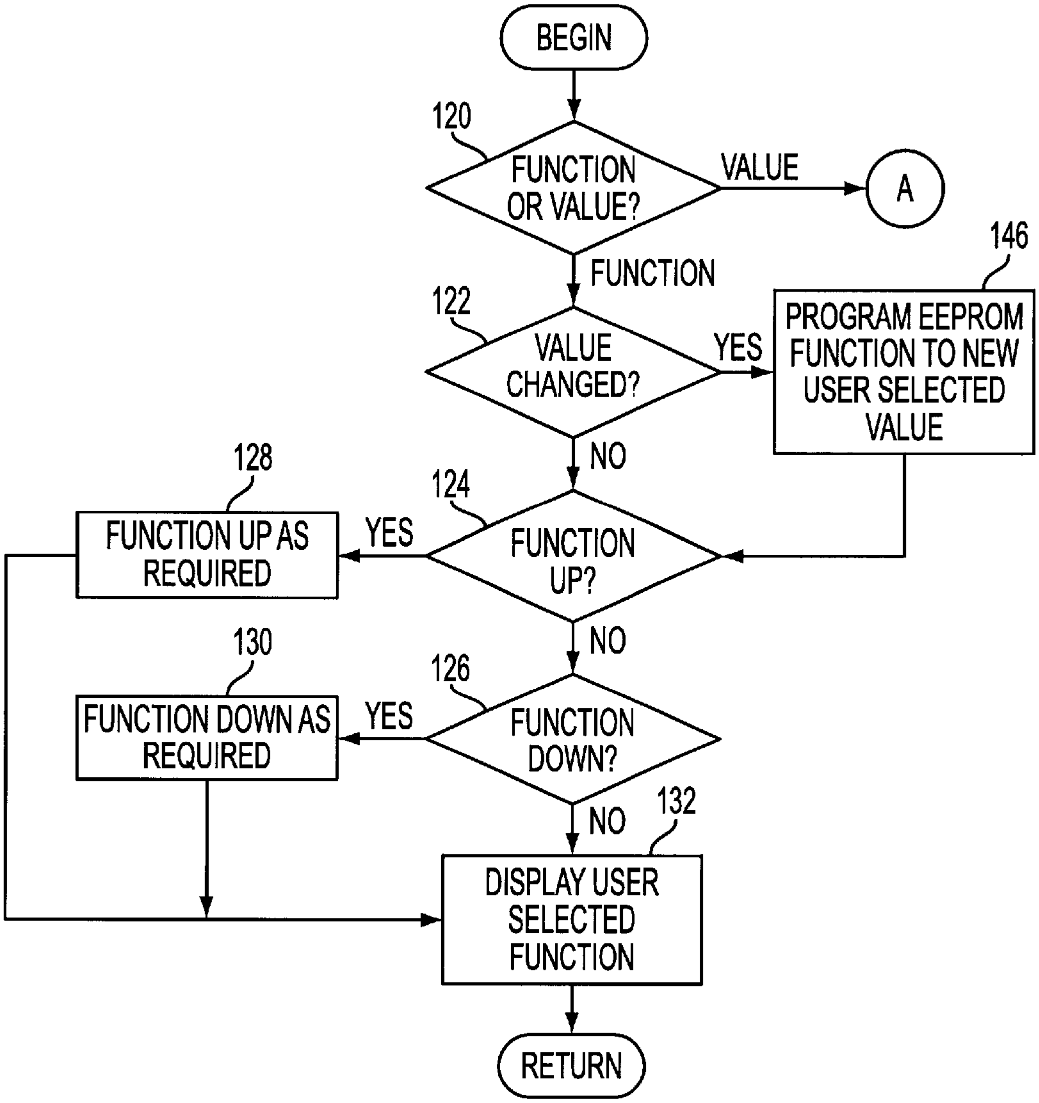
FIGS. 5 and 6 show a flow chart of a method for changing function values in response to user inputs through the remote programmer of the ignition system of FIG. 1.
Figure 6:
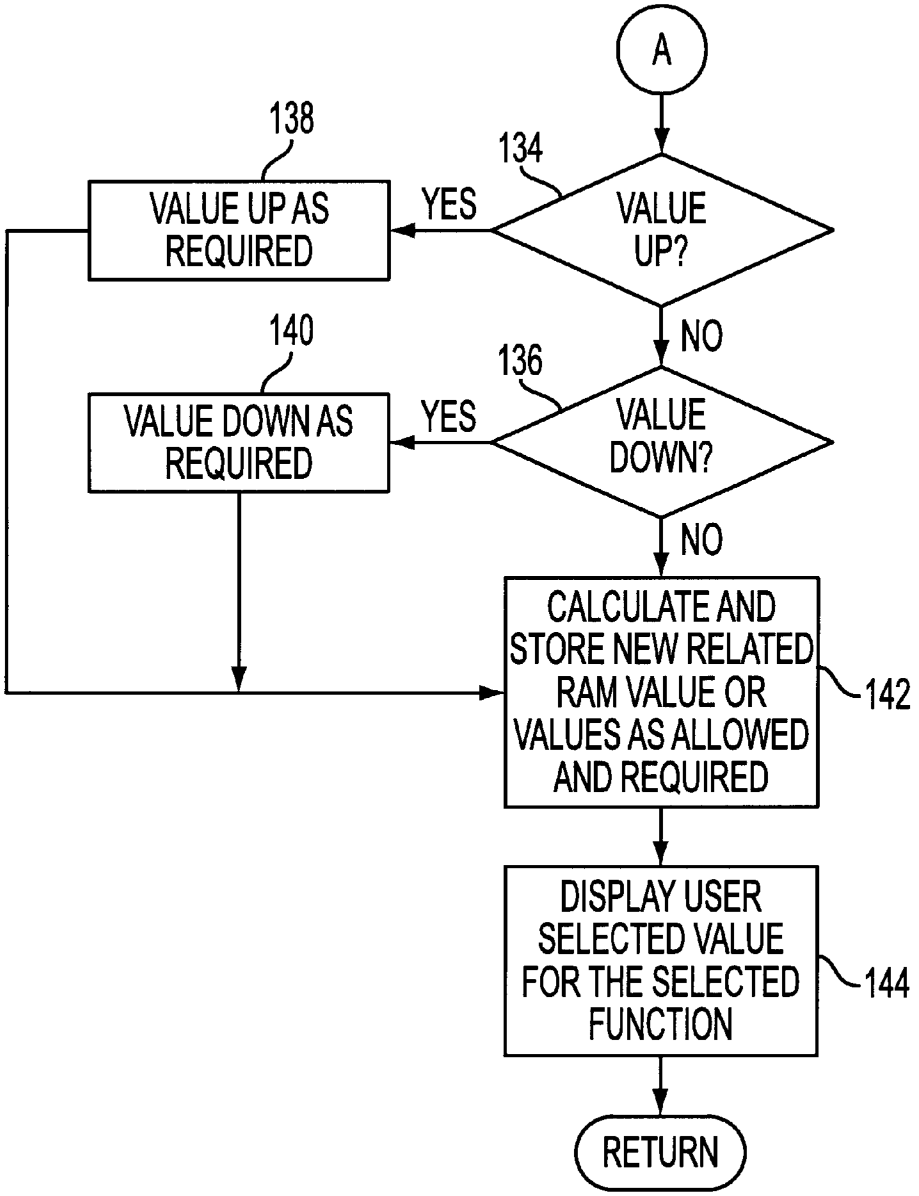

Referring also to FIGS. 5 and 6, a process for changing the system function values stored in system function indices of the ignition system microcontroller 20 in response to user inputs through the remote programmer 12 is shown. Referring first to FIG. 5, the process includes, at 120, monitoring the function and the value switches 102, 104 of the programmer 12. If the function switch 102 is selected, and the value has not been changed at 122, the microcontroller scans the scroll, i.e., up and down switches 106, 108. If one of the scroll switches 106, 108 is selected by a user, at 124 and 126, the microcontroller 20 moves the function up or down as required at 128, 130. If neither scroll switch 106, 108 is selected, or if one of the scroll switches has been selected and the function has been moved up or down, the resulting function is displayed at 132.

If the value switch 104 is selected, at 120, the microcontroller 20 scans the scroll switches 106, 108. If one of the scroll switches 106, 108 is selected by a user, at 134, 136 of FIG. 6, the microcontroller 20 moves the value up or down as required at 138, 140. If neither scroll switch 106, 108 is selected, or if one of the scroll switches has been selected and the function has been moved up or down, at 142 the resulting value is used to calculate and store new related RAM value or values as allowed and required by the system program code. The resulting value is then displayed, at 144. If the function switch 102 is selected again, at 120 of FIG. 5, the microcontroller 20 saves the new value of the last displayed function code into the programmable read only memory of the microcontroller, at 146.

Thus, an operational ignition system can include the high voltage unit 18, the control module 16 and the remote programmer 12, i.e., the system does not require the starting line input device 14. Preferably, the high voltage unit 18 is mounted in an engine compartment of a vehicle, while the control module 16 and the remote programmer 12 are mounted in a passenger compartment of the vehicle. The system, however, can also include the starting line rev limiter input device 14.

Starting Line Rev Limiter Input device

Figure 7:
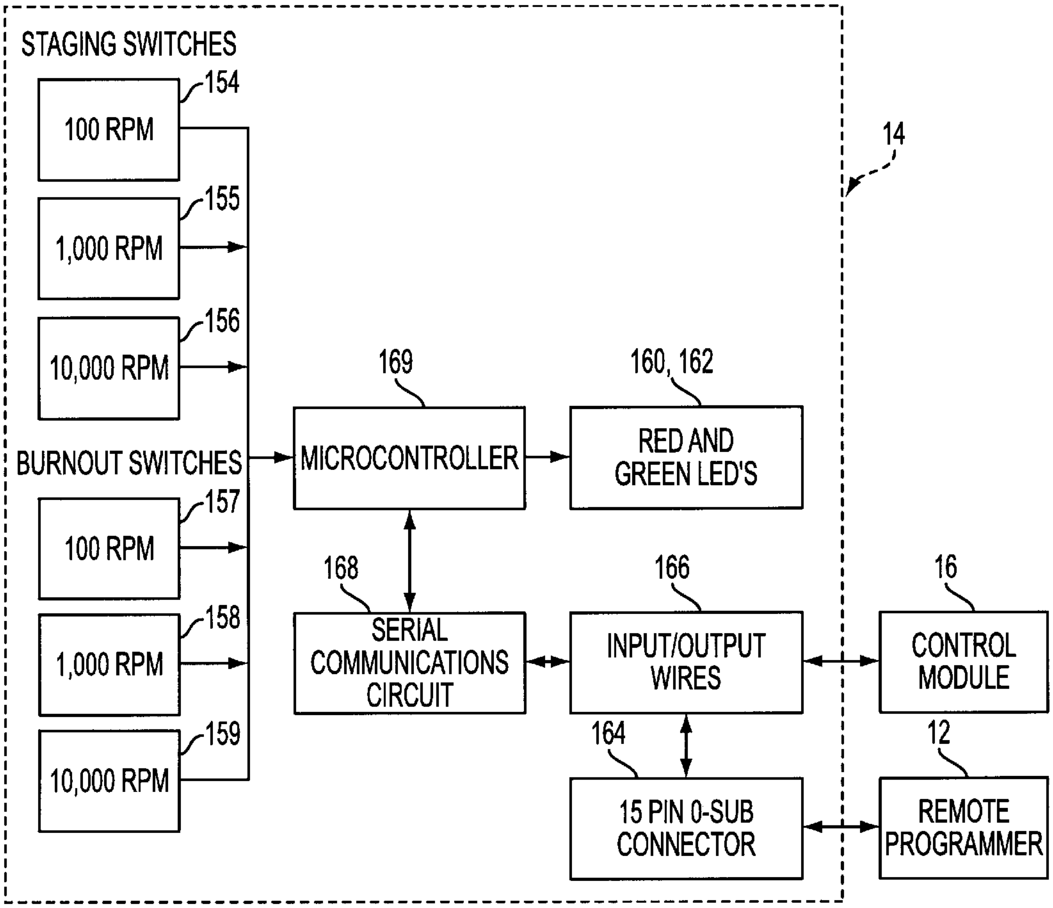
FIG. 7 shows a hardware diagram of a starting line input device of the ignition system of FIG. 1.
Figure 8:
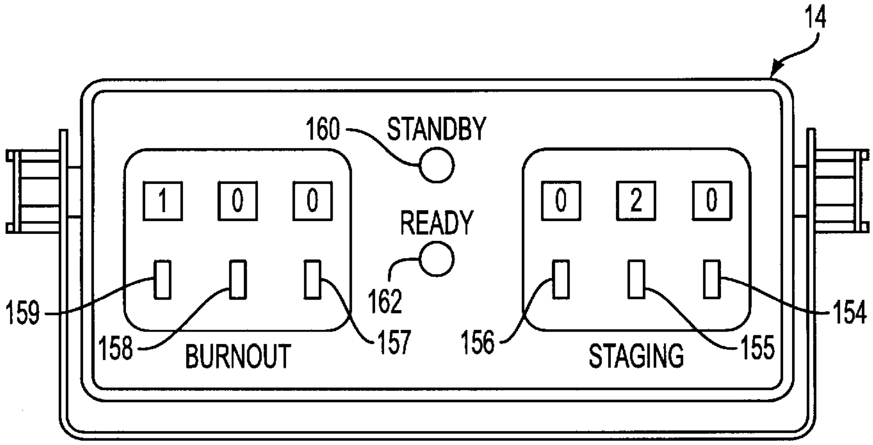
FIG. 8 shows a front elevation view of the starting line input device of the ignition system of FIG. 1.

Referring to FIGS. 1,7 and 8, The starting line rev limiter input device 14 operates as an interface between the user and the control module 16 to facilitate rapid changes to the "staging" and "burnout" engine speed limiter function values contained in the EEPROM of the microcontroller 20 of the control module. The input device 14 utilizes its own microcontroller 169 to process user inputs through switches 154–159, convert the user input into usable codes for the control module 16, and communicate the usable codes to the control module. It should be understood that the system 10 can include just the input device 14, without the remote programmer 12, or can include both the remote programmer and the input device, or just the remote programmer without the input device.

Figure 9:
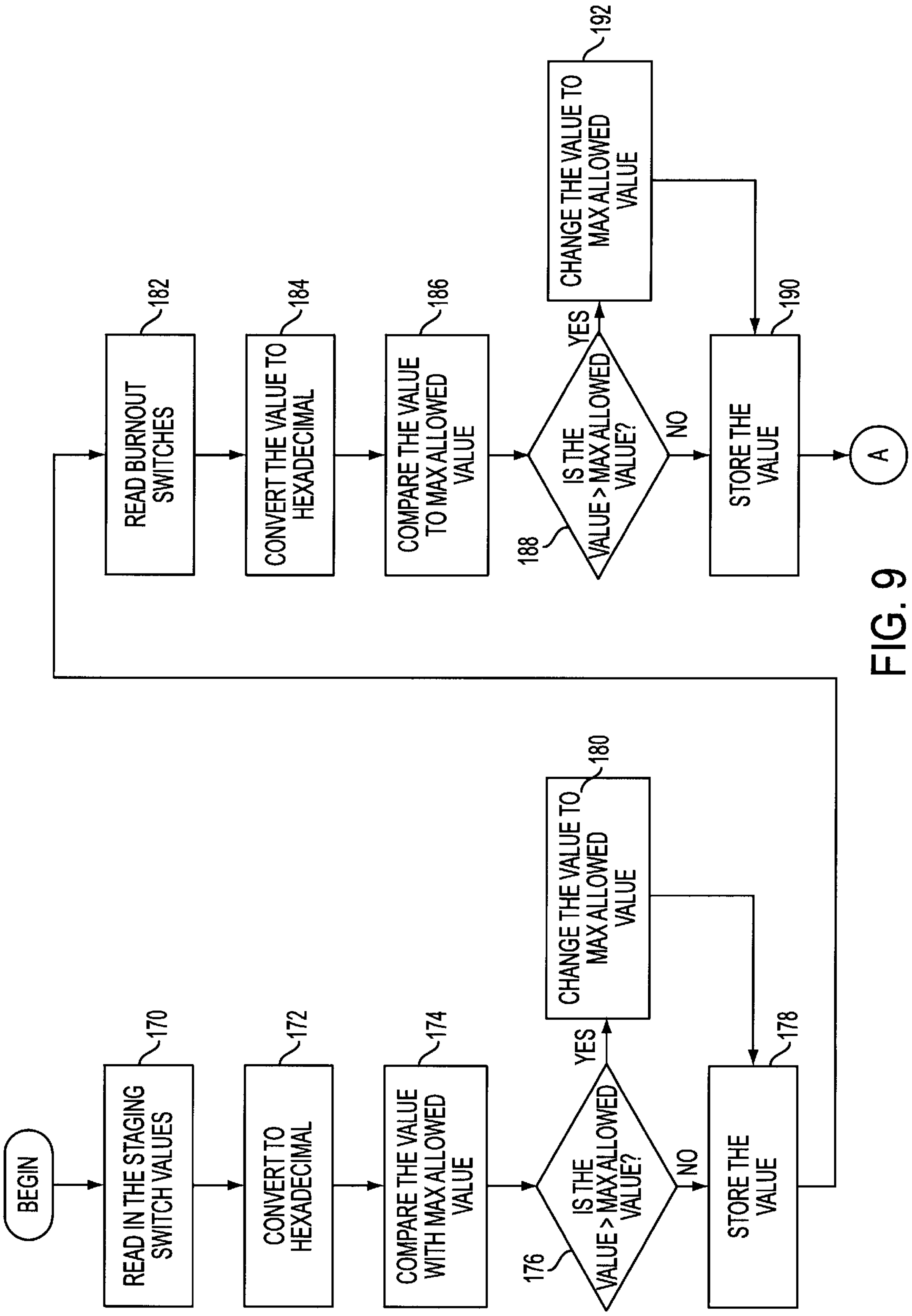
FIGS. 9 and 10 show a flow chart of a method for changing function values in response to user inputs through the starting line input device of the ignition system of FIG. 1.

Referring in particular to FIG. 9, the switches 154–159 of the input device 14 comprise two sets of three rotary, push-button-style binary-coded decimal (BCD) switches for user input. The switches are of a non-complementary style. One set of switches 154–156 is labeled "STAGING" and the other set of switches 157–159 is labeled "BURNOUT". Two different colored LED indicators 160, 162 protrude from the input device 14, with one indicator preferably labeled "STANDBY" and the other indicator labeled "READY".

When the input device 14 is incorporated into the system 10, the input device connects to the control module 16, while the programmer 12 connects to the input device 14. The input device 14 includes a mate connector 164 for connection to the female connector 116 of the programmer 12, and a female connector 166 for connecting to the male connector 167 of the control module 16. The input device 14 communicates with the control module 16 via a serial communications circuit 168. The programmer 12 communicates directly with the control module 16, but the control module is programmed such that the input device 14 will override any burnout and staging information programmed into the control module from the programmer. The programmer 12, when attached to the input device 14, will display the updated system function values from the control module 16 for staging and burnout settings as entered through the input device.

The switches 154–159 relate to either 100, 1,000 or 10,000 so that a range of 0–16,000 rpm in 100 rpm increments can be achieved. If a value greater than a maximum allowed rev limiter value, e.g., 16,000 rpm, is selected, the microcontroller 169 is programmed to send a value of 16,000 to the control module. The microcontroller 169 of the input device 14 can comprise a Microchip PIC16C73A running at 4 MHz, for example. An electrical schematic of the input device is contained in commonly owned U.S. Provisional Patent Application Serial No. 60/063,962, the disclosure of which has been incorporated herein by reference.

Figure 10:
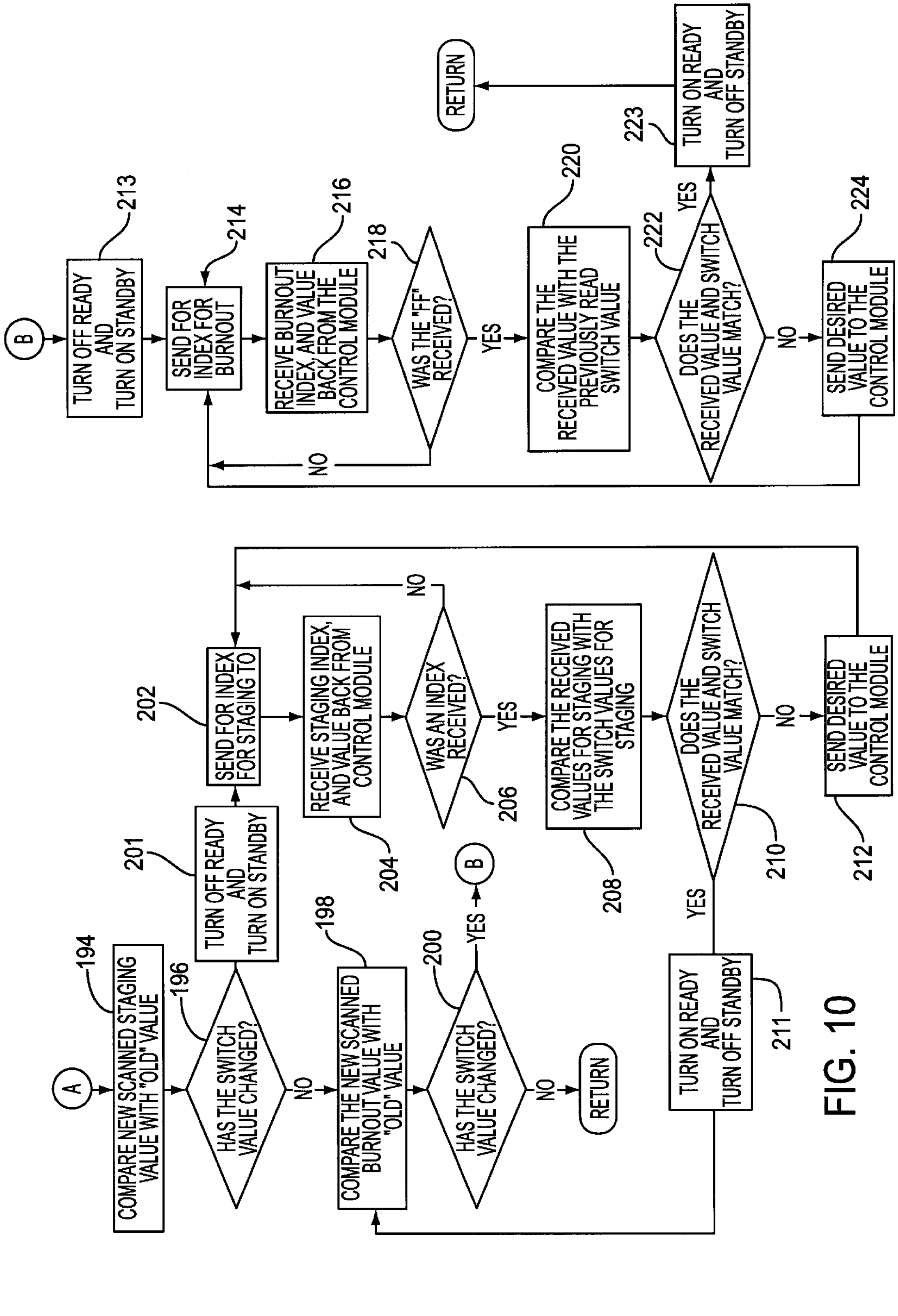

FIGS. 9 and 10 show a process for changing values of the staging and the burnout speed limiter features stored in the EEPROM of the control module 16 as carried out by the microcontroller 169 of the starting line input device 14 in response to user inputs through the input device 14. Referring to FIG. 9, the process begins at 170 when the staging switches' 154–156 value is read. The switches' 154–156 value is then converted to hexadecimal at 172, and compared with a maximum allowed rev limiter at 174. If the switches' 154–156 value is less than the maximum allowable rev limiter value, at 176, then the switches' value is stored, at 178, in a memory of the microcontroller 169 of the input device 14. If the switches' value is greater than the maximum allowable rev limiter, at 176, then the staging switches' value is changed to the maximum allowable value, e.g., 16,000 rpm, at 180, and then stored, at 178. The same process is repeated for the burnout switches 157–159 at 182 through 192.

Referring to FIG. 10, at 194, the "newly" stored staging switches' 154–156 value is compared with a previously stored "old" staging switches' value. If the old and the new staging values are equal, i.e., if there has not been a change to the staging switches 154–156, at 196, the "newly" stored burnout switches' 157–159 value is compared with a previously stored "old" burnout switches' value, at 198. If the old and the new burnout values are equal, i.e., if there has not been a change to the burnout switches 157–159, at 200, the process is started over.

If the staging Switches 154–156 are found to have changed, at 196, then the microcontroller 169 first turns the ready LED 162 off and turns the standby LED 160 on, at 201. At 202 and 204, the microcontroller 169 "asks" the control module 16 for, and receives back the currently stored value for the staging rev limiter feature. If a value is not received back, at 206, the microcontroller 169 repeats until a response is received back from the control module 16. If a value is received back, at 206, then the microcontroller 169 compares the staging value from the control module 16 with the newly entered staging switches' 154–156 value at 208. If the staging value from the control module 16 equals the newly entered staging switches' 154–156 value, at 210, then the ready LED 162 is turned on and the standby LED 160 is turned off, at 211. If, however, the staging value from the control module 16 does not equal the newly entered staging switches' 154–156 value at 210, then the microcontroller 169 of the input device 14 instructs the microcontroller 20 of the control module 16 to replace the staging value currently saved in EEPROM with the newly entered staging switches' 154–156 value, at 212. If the burnout switches 157–159 are found to have changed, at 200, then the microcontroller 20 repeats the same process for the burnout values, at 213 through 224.

Accordingly, a user at the starting line can readily change stored rev limiter parameters for staging and burnout conditions. Of course, remote programmer 12 can perform this function, although input device 14 tends to be a more convenient and efficient means for accomplishing the same result.

Ignition Timing Operation and Timing Curve Data

The present invention includes an improvement insofar that ignition timing curve data is provided on a per-cylinder basis to account for variations among cylinders. Typically, each cylinder in an engine is slightly different in terms of flow capacities, air/fuel ratios, flow dynamics and so forth. Accordingly, the invention allows for optimal performance, including programmable retuning, by providing cylinder-specific timing adjustment data. The benefit of this is that the user can harness the maximum performance from a given engine to account for such things as differences in cylinder characteristics, imperfectly machined crankshafts, and so forth. Detailed aspects of the individual cylinder timing aspect of one embodiment of the invention are described in the Installation Instructions and Troubleshooting Manual (© 1999) published by Holley® Performance Products Inc., herein incorporated by reference.

The general operation of charging and discharging bathtub capacitor 22 through ignition coil 100 was described above in the subsection entitled "Control Module and High Voltage Unit." As there described, timing signal data (collectively labeled on FIG. 2 as "engine speed signal") received from engine sensors is input into control module 16 to tell it when to discharge bathtub capacitor 22 in order to fire the cylinders at the proper time. In the digital ignition system providing a single timing curve for all cylinders, this timing signal data will be a trigger signal generated by a so-called trigger pickup device located at the distributor or crankshaft. The trigger pickup device may be a magnetic pickup or so-called Hall Effects (HE) pickup. The trigger signal informs control module 16 each time a cylinder is approaching top dead center (TDC) so that a new spark can be created. Control module 16 computes engine speed (rpm) based on trigger signal frequency and looks up the appropriate timing to be applied. Based on that timing, control module 16 will discharge the stored energy at a computed period of time after receipt of the trigger signal.

In the preferred embodiment providing cylinder-specific timing values (adjustment curves), the timing signal data also includes an identification pulse or signal ("ident signal") so that control module 16 tracks the identity of the next cylinder to be fired. This way control module 16 can retrieve not only a base or nominal timing value (common to all cylinders), but also a cylinder-specific "trim factor" from a stored cylinder timing adjustment curve.

Figure 12:
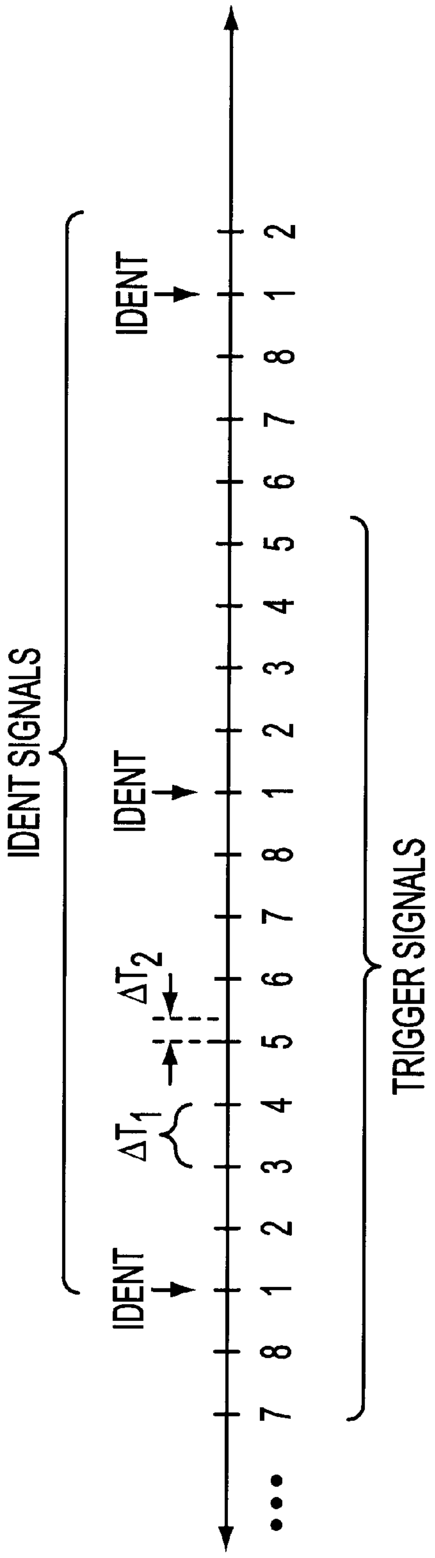
FIG. 12 depicts the sequence of trigger signals and ident signals for the cylinder-specific implementation of the invention for an eight cylinder engine.

FIG. 12 illustrates timing signal data for an exemplary 8-cylinder engine system. Trigger signals are generated by the trigger pickup at a fixed pickup point (e.g., 38 degrees Before Top Dead Center or BTDC) as each subsequent piston approaches top dead center during the compression stroke. The engine speed is proportional to the frequency of the trigger pulse train at any given point. Therefore ΔT1 can be used to compute engine speed to look up the correct base curve timing data. Whenever the first cylinder is next to be fired, an ident pulse is generated so that control module 16 continually tracks which cylinder is to be fired next. This way, control module 16 can apply the correct cylinder-specific timing trim data. The base curve timing data will be combined with the cylinder-specific timing trim data, and any other timing functions (such as programmable retard functions, launch control, boost retard, and so on), to develop a net timing value. This net timing value will be used by control module 16 to discharge bathtub capacitor at the correct time. In FIG. 12, ΔT2 represents the time after the trigger signal for cylinder 5 that the spark is discharged (the net timing value is actually the trigger pickup point minus ΔT2; if ΔT2 were two degrees, it follows that the timing value was 38−2=36 degrees BTDC).

Figure 13:
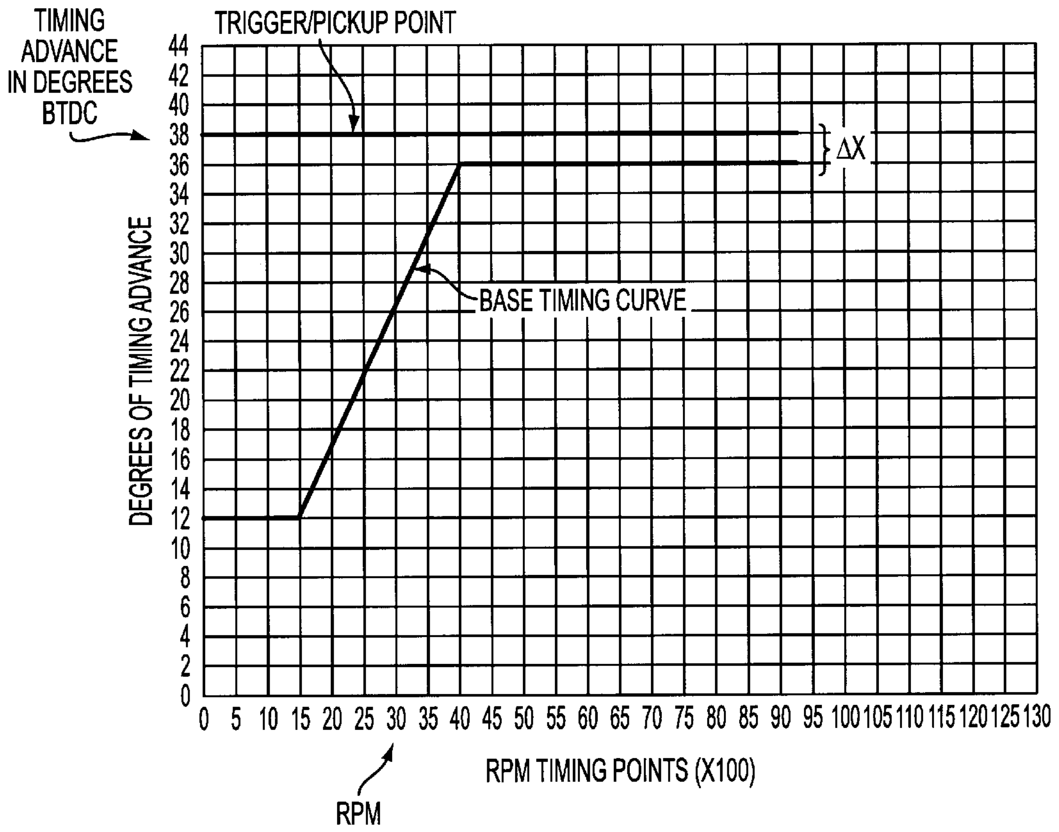
FIG. 13 illustrates an exemplary timing curve .

FIG. 13 illustrates an exemplary timing curve. Based on a computed engine speed, the timing curve data is accessed to apply the charge at the proper time. In this example, timing is fixed at 12 degrees before TDC for 0–1500 rpm (idle), linearly increases between 1500–4000 rpm (as piston speed increases) and remains constant after 3600 rpm. The pickup point is constant, here at 38 degrees BTDC. Of course, the pickup point may never be less than the timing, ergo the ΔX difference between the maximum timing point and the trigger/pickup point. ΔX must be sufficient to permit microcontroller 20 to timely perform the operations. In the preferred embodiment of the invention, the pickup point will be automatically computed by remote programmer 12 based on the programmed values for the base timing curve, cylinder-specific timing curves, retard functions and so forth.

Figure 14:
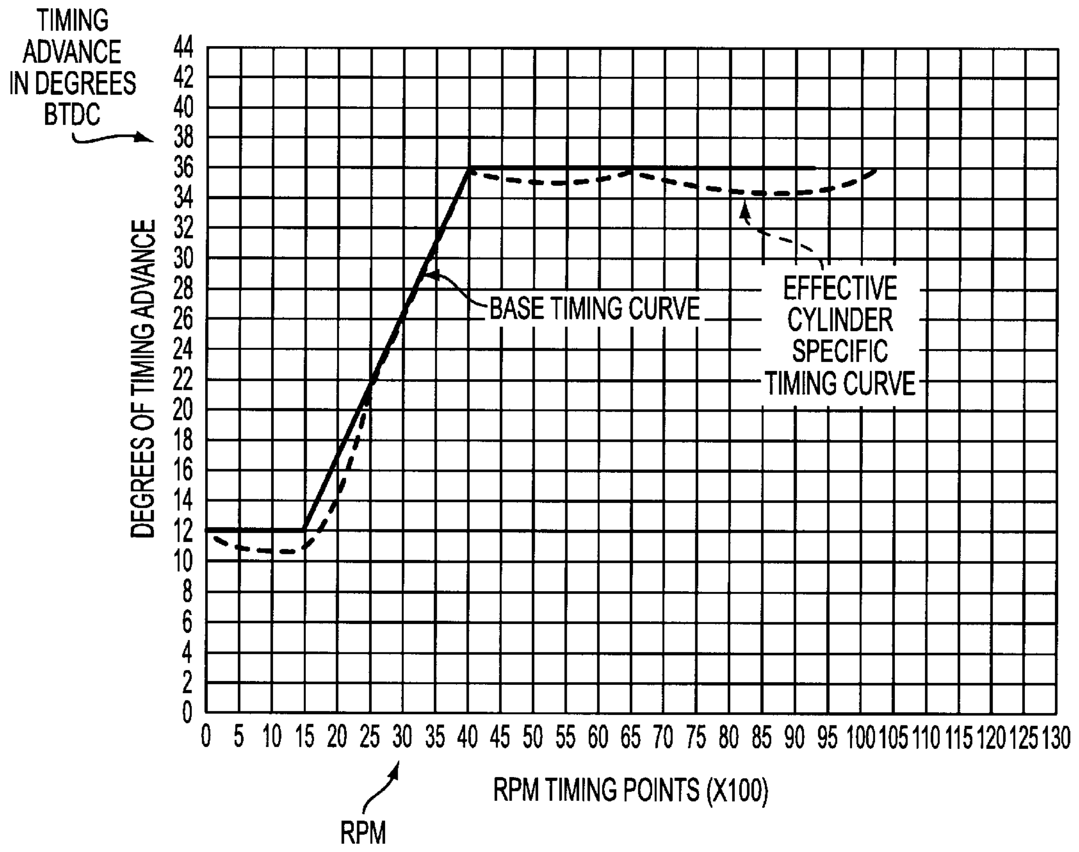
FIG. 14 illustrates the effective timing curve that is rendered by providing cylinder-specific timing curve adjustment data for the digital ignition system.

FIG. 14 illustrates how the base timing curve data is adjusted by cylinder trim data to effectively provide a cylinder-specific curve, as illustrated by the dotted line variation from the nominal base timing curve (solid line).

Figure 15:
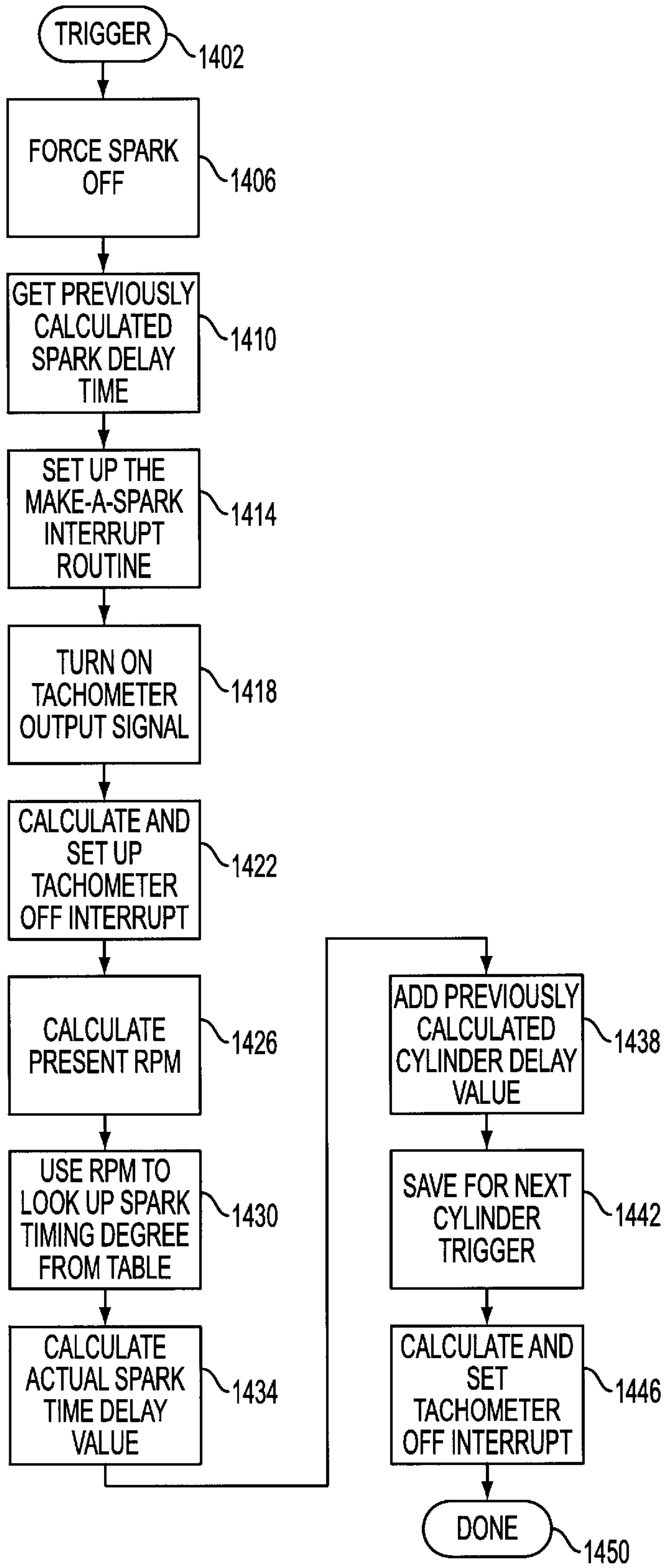
FIG. 15 illustrates the steps carried out in computing cylinder specific timing values according to one embodiment of the invention.
Figure 16:
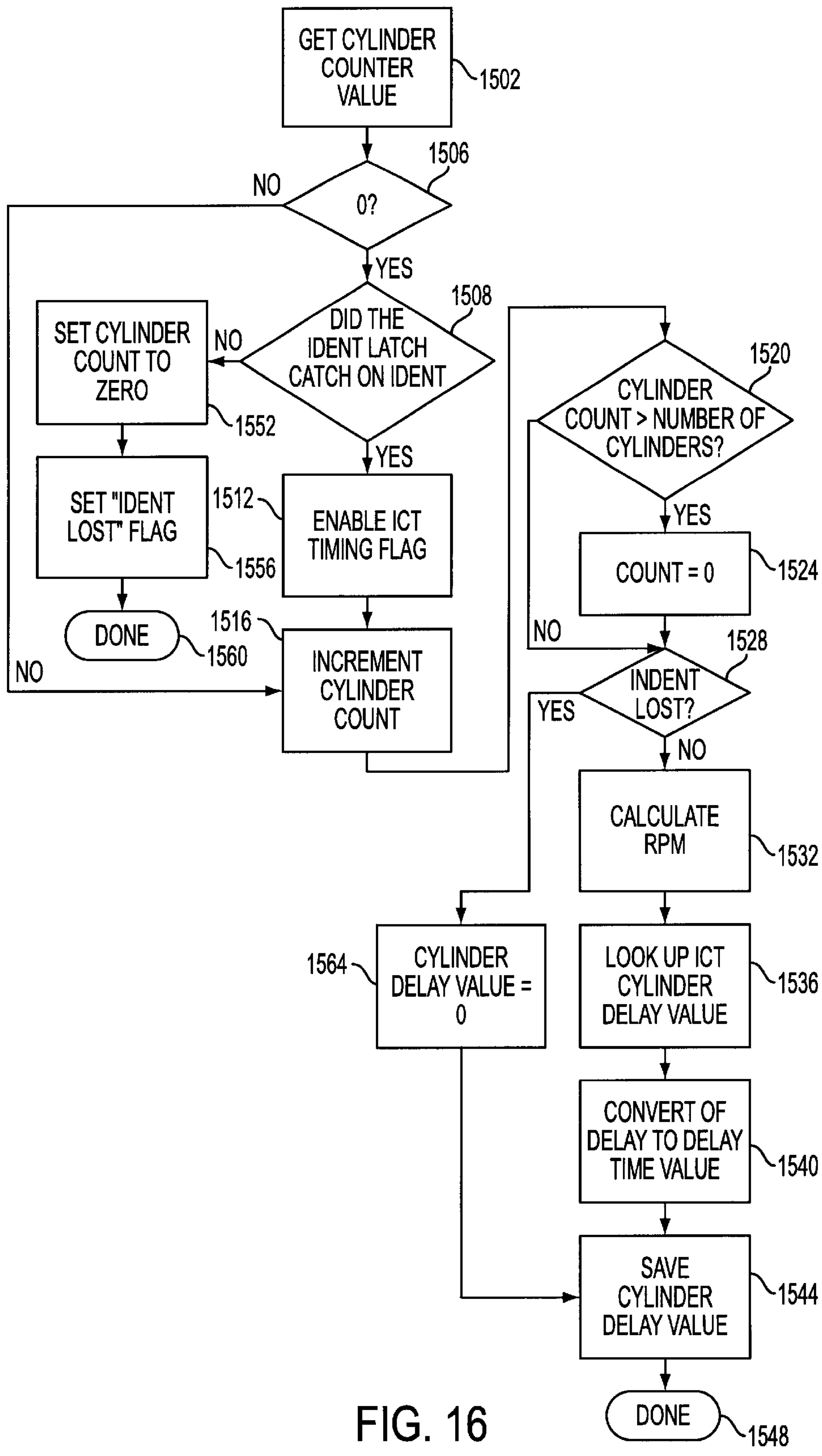
FIG. 16 illustrates the steps carried out in computing the cylinder specific adjustment timing data for a given spark according to one embodiment of the invention.

FIGS. 15 and 16 illustrate the steps undertaken by control module 16 in the cylinder-specific digital ignition system according to an interrupt-type embodiment implemented on a microcontroller-based system such as that depicted in FIG. 2. A trigger signal is received, as in 1402, indicating that the upcoming cylinder is to be sparked. A force spark off flag is set, as in 1406. The previously calculated spark delay time is retrieved from memory, as in 1410. The make-a-spark interrupt routine is set up, as in 1414. Control module 16 turns on the tachometer output signal, as in 1418, and the tachometer off interrupt is calculated and set up, as in 1422. Present RPM is computed, as in 1426, which is based on the time between subsequent triggers. Present RPM is used to look up the base timing value from the base curve ("spark timingdegree"), as in 1430, and from that value the actual base spark time delay value is derived, as in 1434. The previously calculated cylinder delay value (i.e., the cylinder trim from the tachometer off interrupt routine of FIG. 16), is added to adjust the base timing value for that cylinder, as in 1438. The net spark delay value is saved for the next cylinder trigger, as in 1442, and the tachometer off interrupt is enabled, as in 1446.

It is noted that block 1438 may also encompass the addition of other delay values to the base timing value, such as for the retard functions of the ignition system, launch control or boost control. The four retard functions R1–R4 can be programmed for retard as previously discussed. The retard functions can be concatenated to provide a greater net retard, although in the preferred embodiment not more than 34 degrees from the pickup value. The retard functions may be powered by a high output switch providing power such as RPM switch H4 discussed previously. The switching function can be selected from one of switching functions U1–U4 so that the retard function is enabled as a function of rpm and/or time window parameters.

The tachometer off interrupt routine of FIG. 16 is used to compute the cylinder delay value referred to in block 1438 of FIG. 14. According to 1502, microcontroller 20 gets the cylinder counter value. If the cylinder count value equals zero ("yes" of block 1506), microcontroller 20 operates to check for the ident signal that should be forthcoming. If the ident latch (detector) did catch the ident signal, according to the "yes" path of block 1508, the ICT timing flag is enabled, as in step 1512, and the cylinder count is incremented (to 1, in that case), as in step 1516. In this case, the next cylinder is the one corresponding to the ident signal, here cylinder 1.

Returning to the "no" path of block 1508, if the ident latch did not catch the ident signal corresponding to the trigger, the cylinder count is set to 0, as in 1552, and the ident lost flag is set, as in 1556. When the ident lost flag is set, the cylinder delay value will be set to 0 and the ident lost flag is set because the cylinder-specific retard timing adjustment cannot be identified. In this case, no cylinder-specific trim is applied.

In the preferred embodiment, the "ident lost" and "ICT timing" flags can actually be the same flag as the two conditions represent opposing states. In the one state, cylinder tracking is proper and cylinder-specific trim is applied to the timing computation, and in other state cylinder tracking has been lost and no cylinder-specific adjustment is made.

Returning to 1506, if the cylinder counter value is not equal to 0, the cylinder count is incremented, as in 1516, to reflect the upcoming cylinder to be sparked. In 1520, the cylinder count is compared to ensure it does not exceed the programmed number of cylinders, as in 1520. If it does, the count is set to 0, as in 1524 because proper ident signal tracking has been lost.

Otherwise, decision block 1528 flows into the rpm calculation step of 1532. Based on computed rpm, microcontroller 20 looks up the cylinder-specific delay value for that cylinder count. The cylinder delay, which may be expressed in degrees of retard, is converted to a cylinder-specific delay value, as in 1540 (this value is the previously calculated cylinder delay value added to the actual base delay value in step 1438 of FIG. 15). This cylinder delay value is saved to memory, as in 1544.

If ident signal tracking has been lost (block 1528, "yes"), the cylinder delay value is forced to zero, as in block 1564.

In the preferred embodiment, the base timing curve will consist of 32 timing points spanning from 500 rpm to 16,000 rpm in 500 rpm increments. The cylinder specific adjustment curves will consist of 0.1 degree (up to 9.9 degree retard) precision points from 1000 rpm to 16,000 rpm in 100 rpm increments. In one embodiment, interpolation is used only in the base timing table. In another embodiment, interpolation also used in the cylinder-specific adjustment tables to locate interim-rpm values. Additionally, the timing adjustment curve data is preferably applied as engine retard, although it is possible that it could be applied as an advance.

Figure 17:
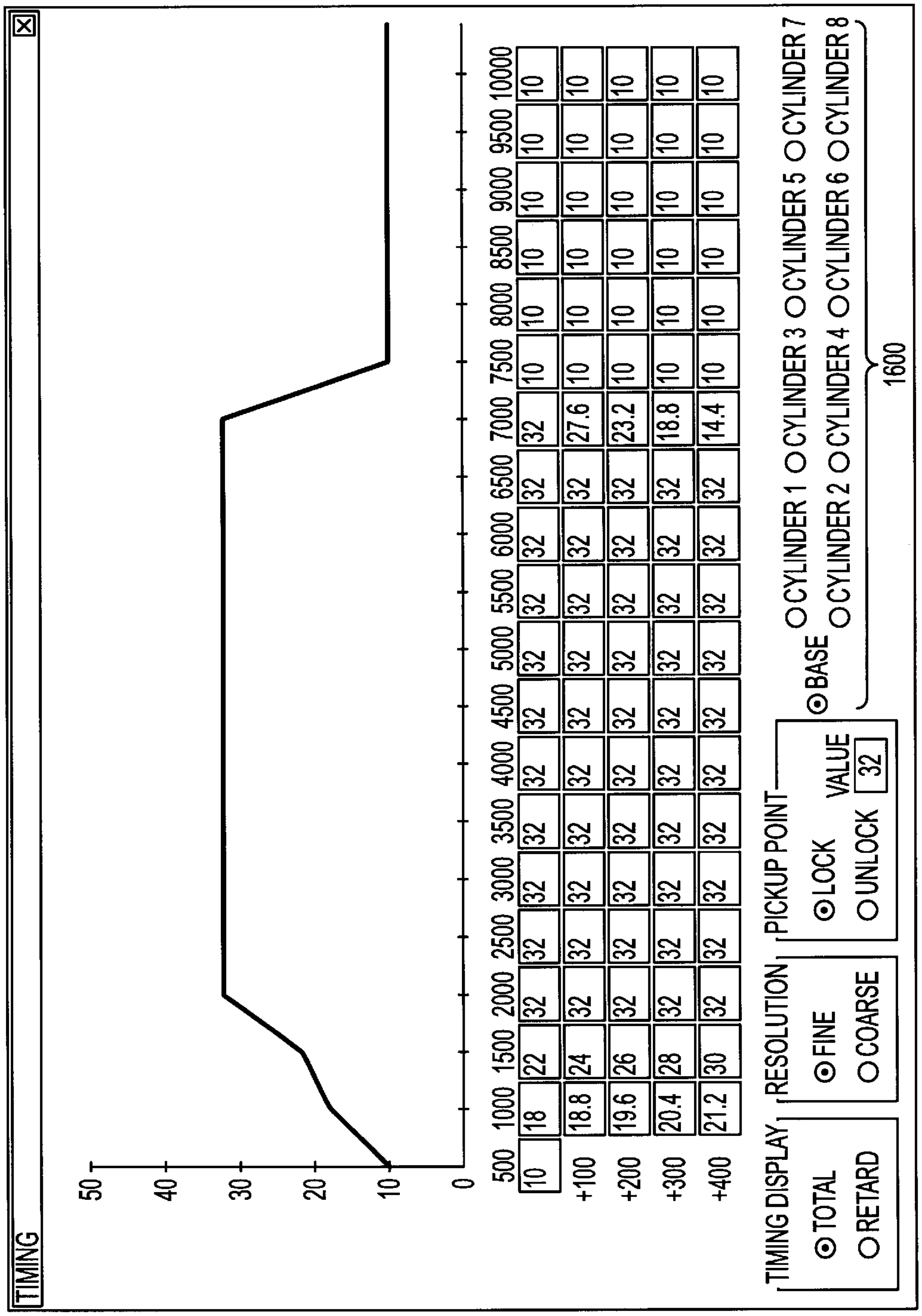
FIG. 17 illustrates an exemplary base timing curve programmed into control module memory for an eight cylinder engine.

The base timing curves and adjustment curves can be programmed using remote programmer 12 (FIG. 2) previously discussed or, alternatively, a personal-computer (or like workstation system) based means for programming the PROM of microcontroller 20. FIG. 17 illustrates stored timing values (in degrees) for the base curve programmed for an exemplary ignition system setting. The pickup point is 32 degrees, and the base timing values span from 10–32 degrees over the 500–10,400 rpm range. As seen in area 1600, the timing curve data for individual cylinders 1–8 in this 8-cylinder engine example can be viewed as well.

Figure 18:
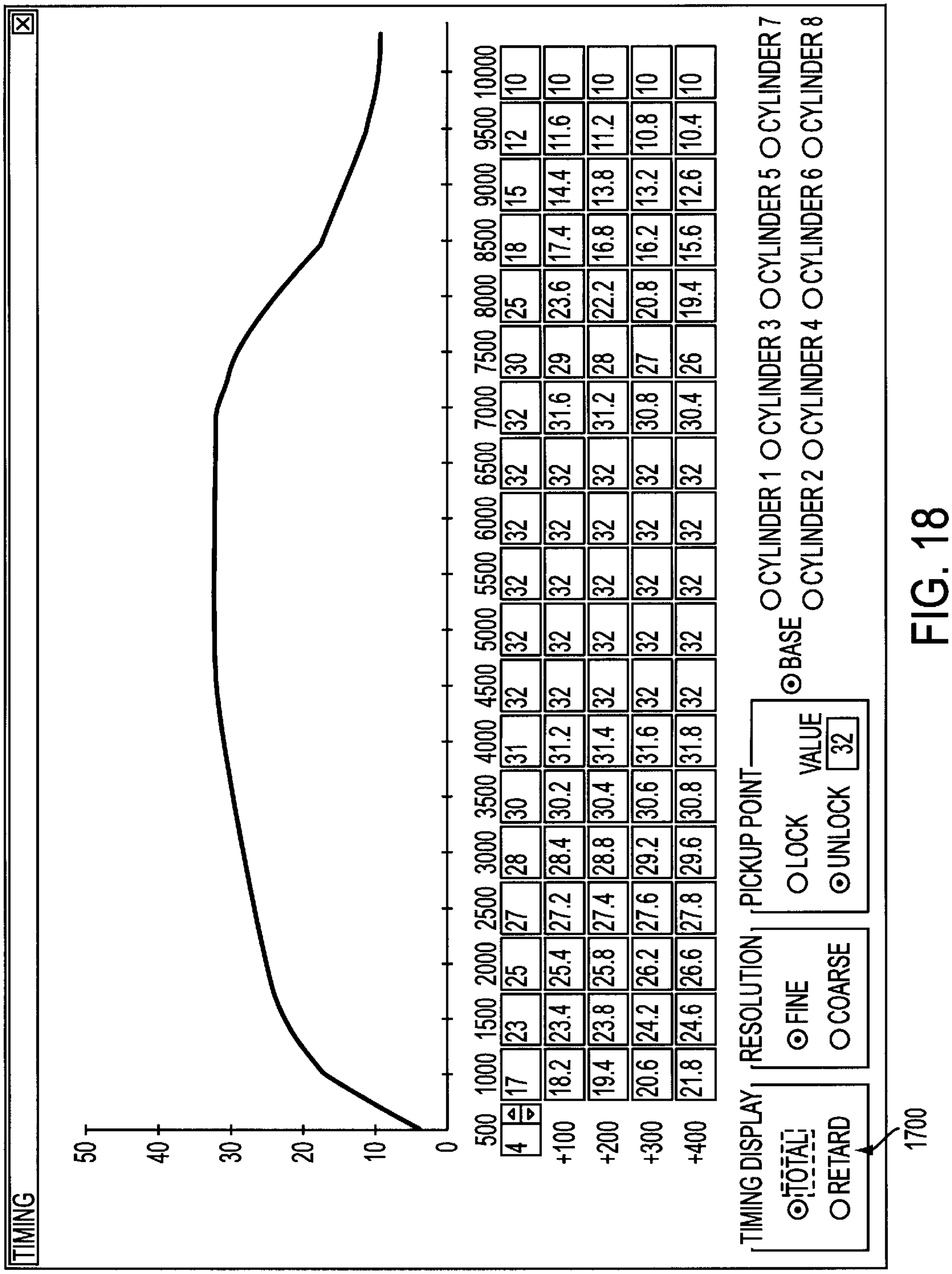
FIG. 18 illustrates the effective timing curve provided for cylinder five after the cylinder specific adjustment data is programmed into control module memory.

If cylinder 5 is selected in area 1600 of FIG. 17, the display changes to that of FIG. 18. This presents the effective cylinder-specific timing curve for cylinder 5. The actual data for the adjustment curve (trim data) can be seen by selecting "retard" in area 1700.

Figure 19:
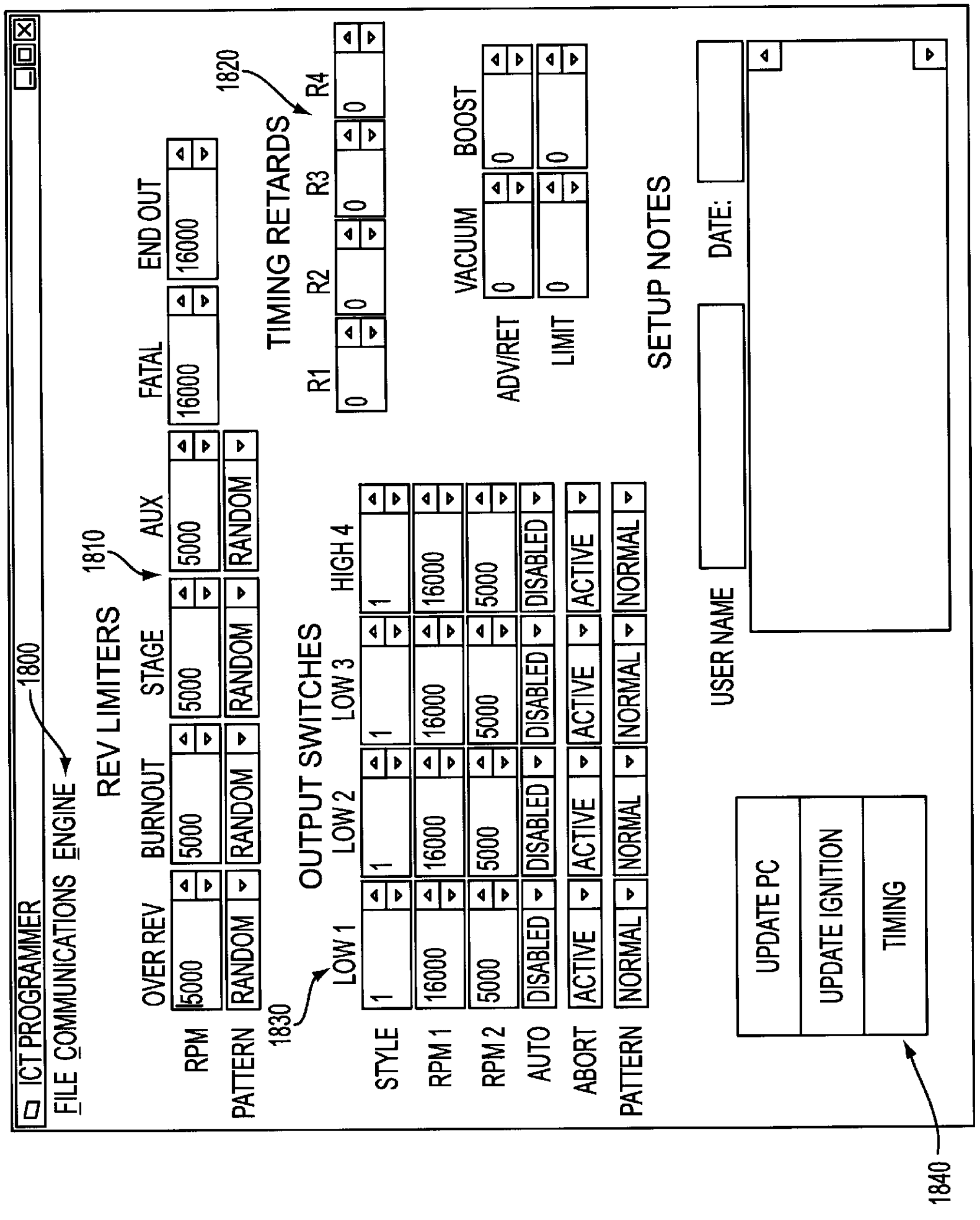
FIG. 19 illustrates an exemplary programming window provided to program the digital ignition system of the present invention.

In general, the cylinder-specific implementation of the digital ignition system is calibrated using a workstation based display menu like that of FIG. 19 or the function/value/scroll buttons of remote programmer 12. Dropdown engine 1800 allows the user to program the number of cylinders, number of cycles, the pickup type (magnetic/Hall Effect) and pickup location (distributor/cam or crank). Rev limiters like those previously discussed can be programmed in area 1810, including the type of misfire pattern (random or several variations of sequential misfire). Timing retards 1820 like those previously described can be programmed. RPM output switches 1830 can be programmed, including a selection of the switching function ("style") previously discussed. Timing can be programmed using timing button 1840, resulting in timing curve graph data like that of FIGS. 17–18.

Figure 20:
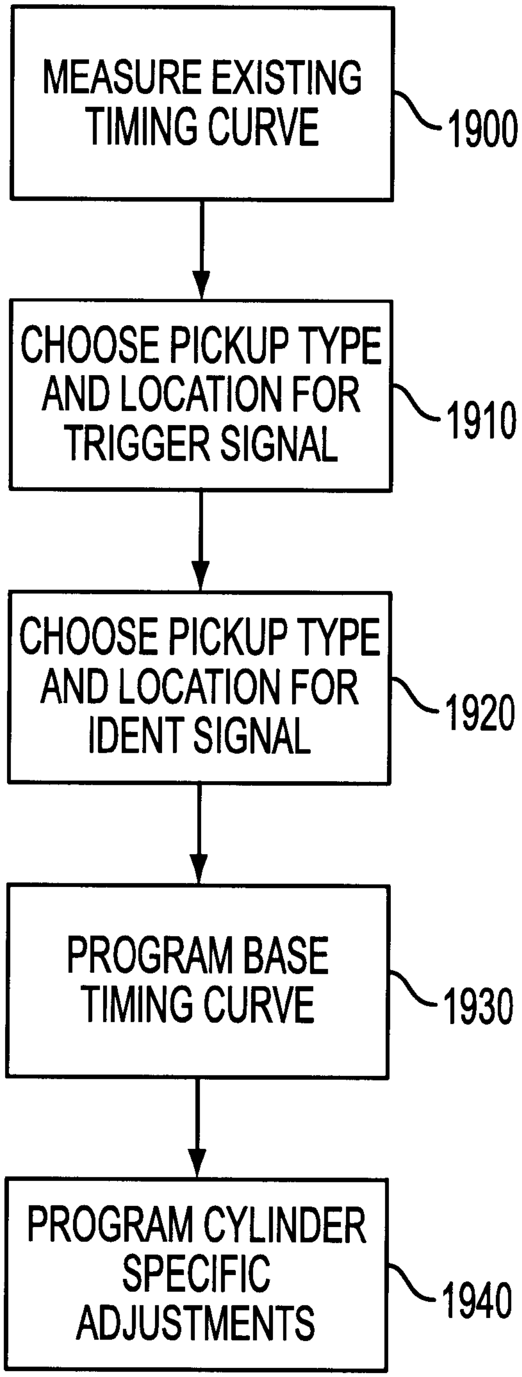
FIG. 20 illustrates the steps which may be carried out for programming the cylinder specific timing according to an embodiment of the invention.

Using such a workstation interface or remote programmer 12, the process of setting timing is set forth in FIG. 20. According to 1900, the existing timing curve is measured to identify the existing base curve data as a benchmark. The user chooses the pickup type and location for the trigger signal, as in 1910. The user chooses the pickup type and location for the ident signal, as in 1920. The base timing curve data is programmed into control module 16 using remote programmer 12 or a workstation, as in 1930. Cylinder specific adjustment data is then programmed, according to 1940. The process of identifying the proper adjustment data is best derived empirically using a dynamometer or cylinder-located pressure sensors. Accordingly, the trim can be varied at each engine speed, for each cylinder, to identify the proper trim factor to optimize performance (e.g., total output or cylinder pressure).

Figure 21:
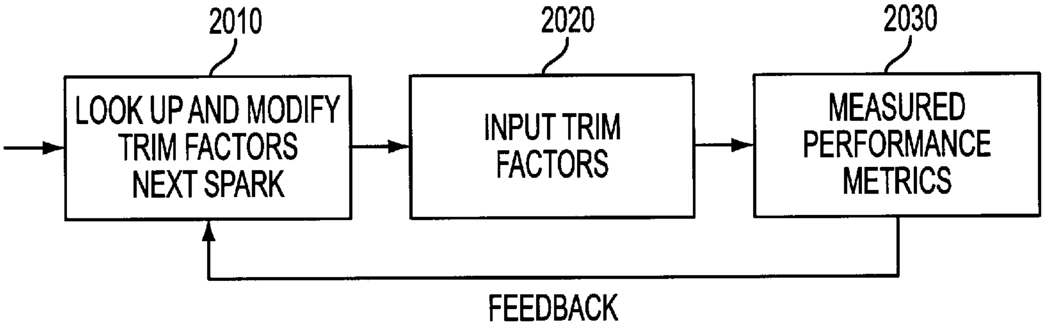
FIG. 21 is a block diagram corresponding to a feedback-type control algorithm for dynamically adjusting cylinder specific trim values according to an embodiment of the invention.

In yet another embodiment, according to FIG. 21, a dynamically self-tuning or "adaptive" cylinder-specific digital ignition system is disclosed. In this embodiment, cylinder-specific data can by dynamically updated based on measured performance so as to continuously self-tune the engine. According to 2010, the trim data for the next spark is looked up from memory and modified according to a control loop algorithm which considers performance metrics from past cycles. The trim factors for that spark are used for ignition for that spark, according to 2020. Performance metrics are measured, according to 2030. These metrics might include some measure of total output horsepower or torque or, as in the preferred embodiment, cylinder-specific metrics such as pressure measurements at each cylinder using piezoelectric pressure transducers or temperature measurements using thermocouples. The information is fed back to microcontroller 20. For the next spark, the control loop algorithm in 2010 calculates modified trim factors based on performance of the last (or multiple past) spark(s). As the trim data is a function of both cylinder number and rpm, a continually updated table is maintained as a function of both cylinder number and rpm.

As is readily appreciated by those of skill in the art of control systems, various techniques could be employed for the control loop algorithm without departing from the basic spirit of this embodiment. For example, so-called alpha and beta feedback factors could be employed to tailor how fast the algorithm converges to new values and/or how many past sparks are considered.

The expected beneficial impact of employing cylinder-specific timing data in the digital ignition system has been demonstrated in practice. A baseline evaluation of the non cylinder-specific digital ignition system (i.e., using a single baseline curve for all cylinders without adjustment data) was evaluated over an rpm band spanning approximately 7200–9200. The average torque produced was about 719 ft-lbs and the average horsepower was about 1120 hp. After programming cylinder-specific trim data for the identical engine, the average torque produced was about 727 ft-lbs and the average horsepower about 1133 hp. In fact, the cylinder-specific programmed engine demonstrated superior performance over the entire measured engine speed band. In a performance-oriented context such as racing, where small performance gains mean the difference between success or failure, this increased performance is a significant benefit of the invention.

Optimized Restrike Operation

The restrike feature provides for optimal low engine speed operation by controlling restrikes based on available electrical energy (e.g., battery voltage) and capacitor charge times. In general, restrikes are used in capacitive discharge systems because the short duration sparks may result in poor performance at low rpm's due to low temperatures and cylinder pressures and poor air/fuel mixtures.

The disclosed restrike feature improves upon the conventional approach by optimally exploiting available electrical energy to provide energy continuity during the cylinder firing sequence.

The actual number of sparks presented will vary based on rpm; as engine speed increases towards 3000 rpm, less time is available for restrikes and so the actual number will decrease. Moreover, the digital ignition system includes a first restrike window constraining the period for which sparks can be made so that there is effectively a point of minimum advance that cannot be crossed. For example, in a system where the pick-up point is 38 degrees, a first restrike window of 34 degrees prevents any restrike later than 38–34=4 degrees of advance (BTDC). Thus, this first restrike window places a restriction on the "time" (measured in degrees rotation) after the pickup point during which a restrike can occur.

In a first embodiment of the digital ignition system's restrike capability, restrikes are provided when rpm is less than/equal to 3000 rpm based on a nominal battery voltage, such as 12.5 volts. Moreover, restrikes are permitted only during a second restrike window of 22.5 degrees of crankshaft rotation after the initial spark. Thus, this second restrike window places a restriction on the period after the initial spark during which restrikes can occur.

With those constraints in mind, it can be seen that the actual number of restrikes will vary as a function of rpm and the applicable stored timing curve data (e.g., total computed timing based on a nominal curve, trim data and any applicable retard functions). For example, assume in a 38 degree BTDC trigger system (with a restrike window of 34 degrees) that the engine speed is 2000 rpm and the total computed timing (at that rpm and for that cylinder) is a 31 degrees advance, or 7 degrees after the trigger point. At that engine speed, one degree of engine rotation takes approximately 84 microseconds [(60*10^6)/(2000*360)]. Consequently, if the nominal capacitor charge time is 1200 microseconds, about 14.5 degrees of crankshaft rotation are required to charge the capacitor. In this scenario, two sparks will be permitted, an initial one at 7 degrees after the trigger point, and a first restrike about 14.5 degrees thereafter. A second restrike is not permitted because it would fall outside the first restrike window corresponding to the minimum advance of 4 degrees.

Continuing with that example, even if the second restrike could occur before the minimum point of advance corresponding to the first restrike window (4 degrees), the second restrike must still fall within the second restrike window of 22.5 degrees after the initial spark. In this example, therefore, it follows that a second restrike could occur only at an rpm slow enough that the "time" for a restrike is less than/equal to 22.5 degrees/2=11.25 degrees. A third restrike could occur only when rpm is slow enough to permit a time for restrike is less than/equal to 22.5/3 degrees, and so forth. Of course, the first restrike window measured from the pickup point must be satisfied as well.

The window constraints notwithstanding, a maximum of six sparks are possible below 3000 rpm, the initial spark and up to five restrikes.

After 3000 rpm, one spark per cylinder is provided. In sum, in this first embodiment of the restrike capability, the bathtub capacitor is charged and discharged a computed number of times per cylinder based on an assumed battery voltage and the capacitor's charge/discharge times.

Based on the above discussion of the first embodiment of the restrike features, it can be appreciated that on the one hand, the restrike frequency must be fast enough to provide the specified number of sparks within the same cylinder firing cycle (put another way, the number of sparks should occur before the next trigger signal). On the other hand, this frequency is constrained by the battery voltage and capacitor charge/discharge times. Accordingly, in this first restrike embodiment, the number and/or rate of restrikes represents a balance between competing factors that is often suboptimal. For example, in the example at 2000 rpm described above, if battery voltage were higher than a nominal assumed value, a greater number of restrikes may be permitted because fewer crankshaft degrees are required for each charging cycle.

An improved embodiment is provided by a dynamic multistrike embodiment which optimizes the number and frequency of restrikes. The rate and number of restrikes will be optimized based on a cylinder-specific computation that considers measured battery voltage. By making the number of restrikes commensurate with available electrical energy from the battery, this improved restrike embodiment optimizes the firing for low rpm cylinder cycles so that "energy continuity" is provided. The benefit is improved low engine speed performance.

Figure 22A:
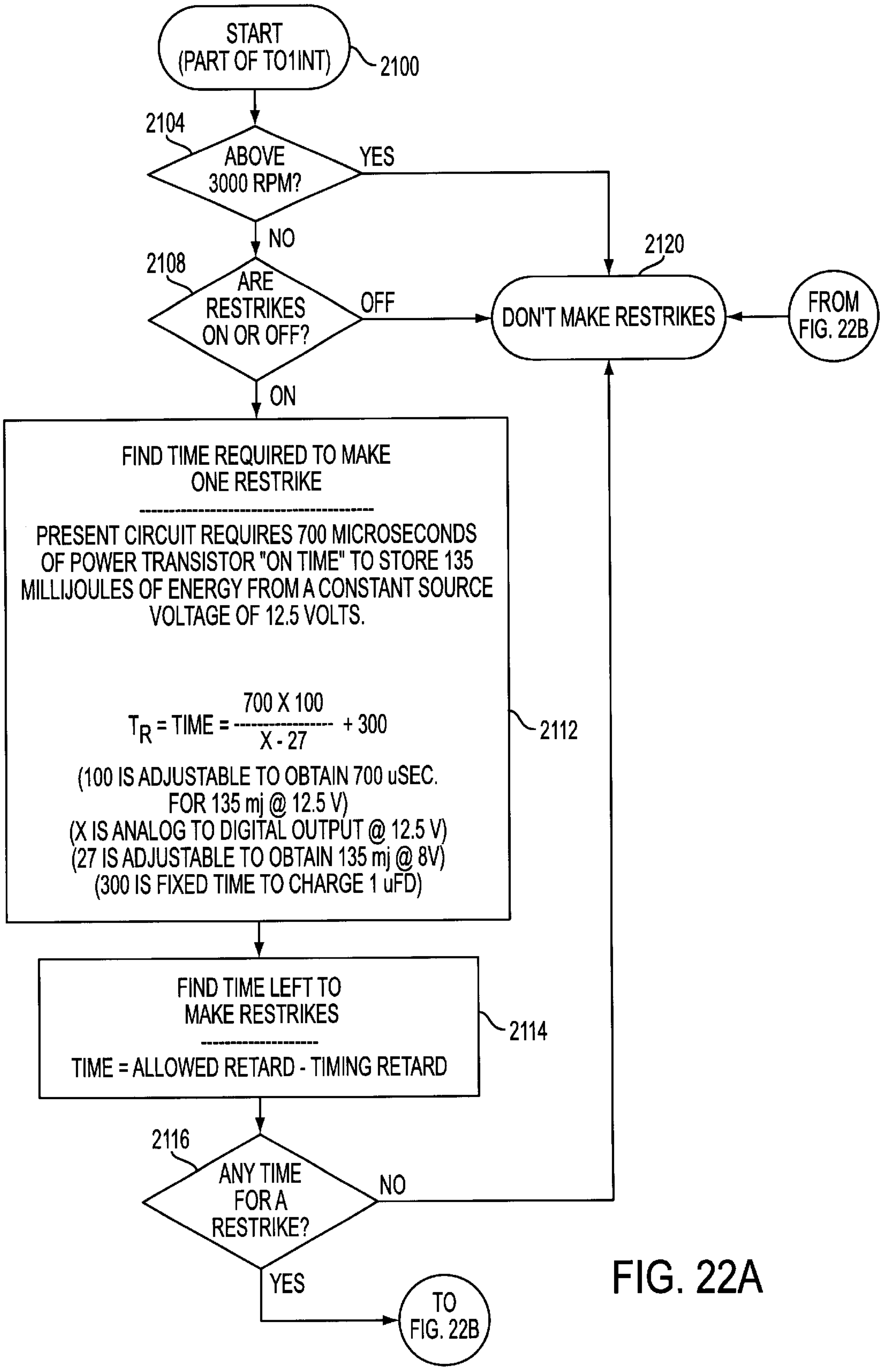
FIGS. 22A–22C illustrates the logic for implementing an optimized restrike function for low engine speed application according to one embodiment of the invention.
Figure 22B:
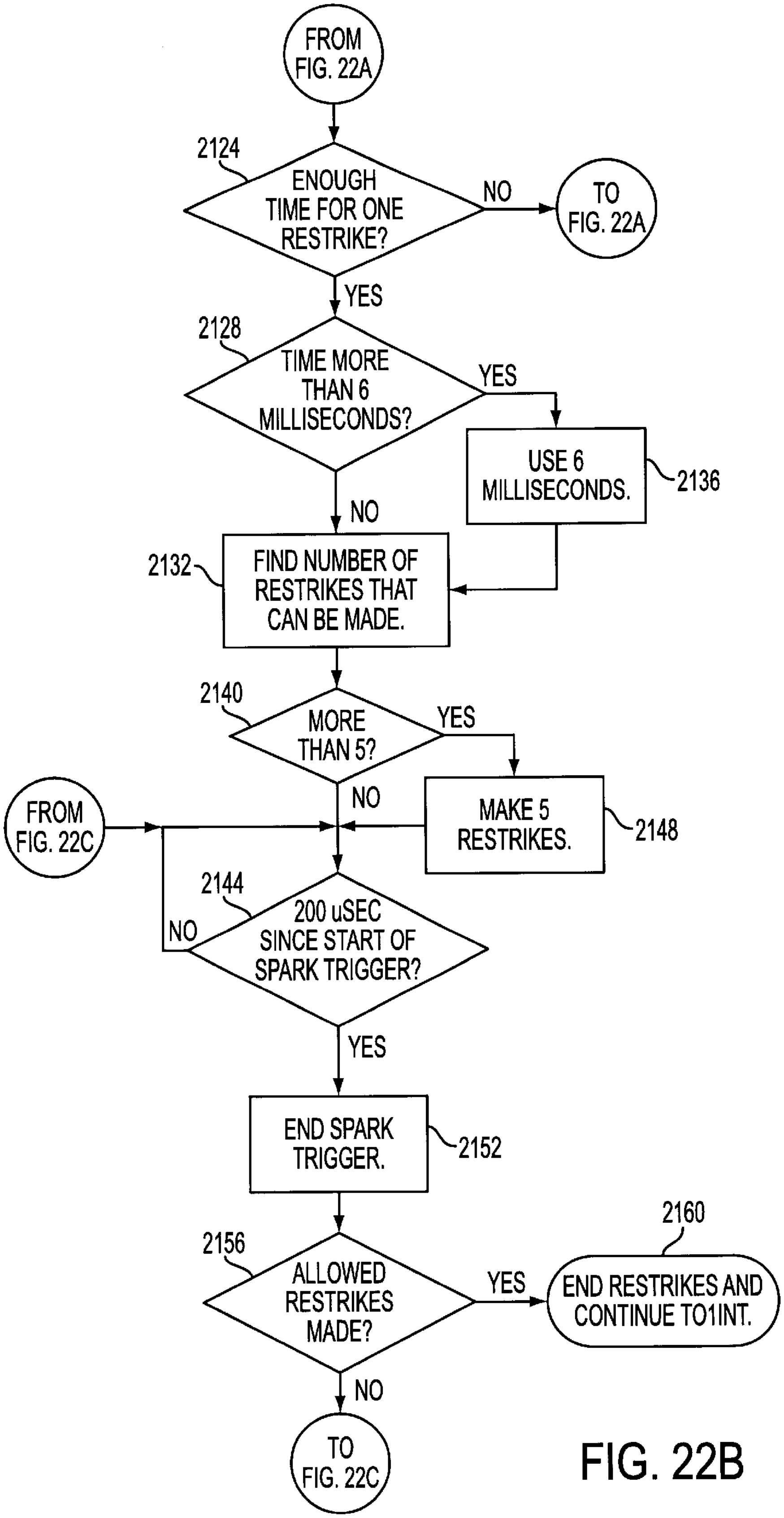
Figure 22C:
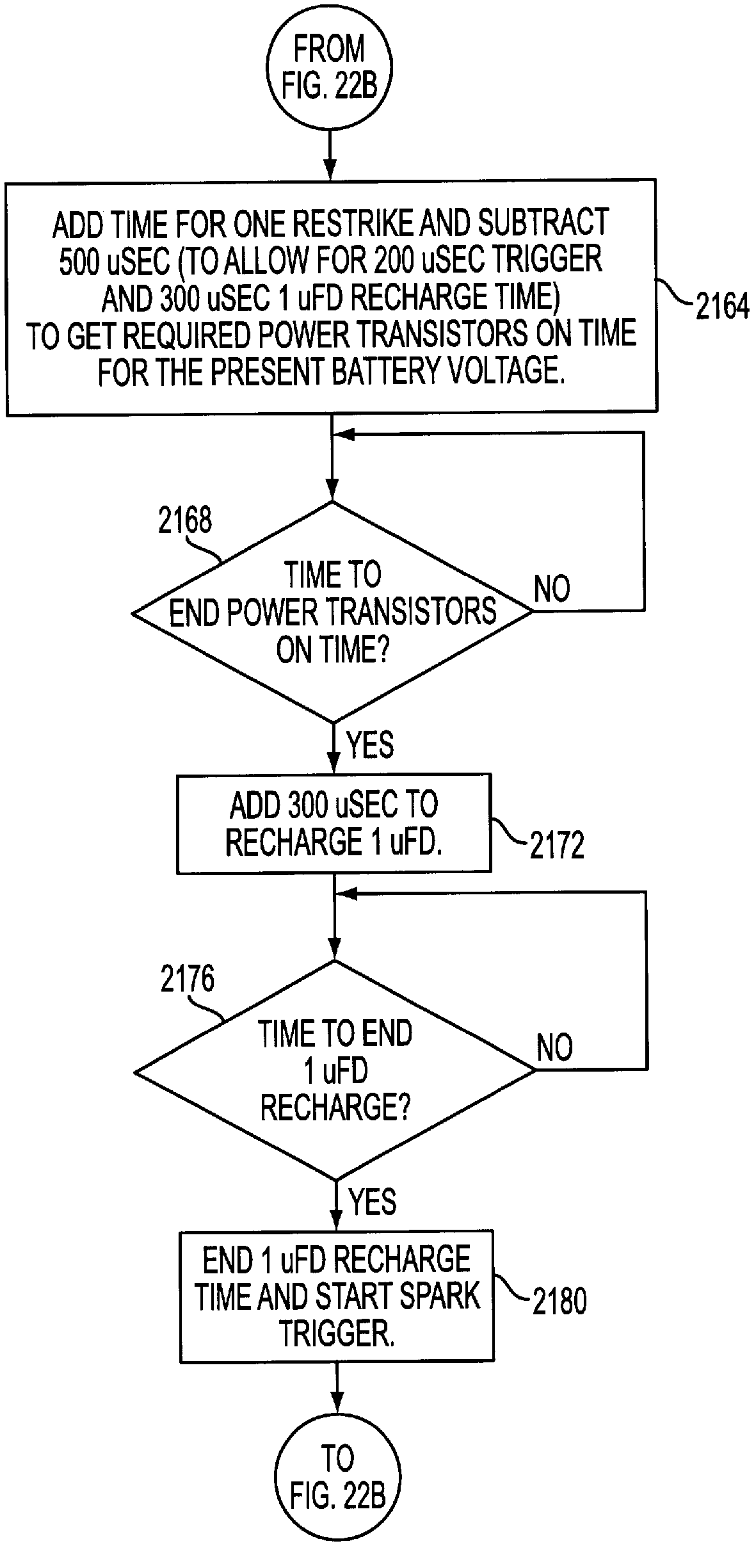

FIGS. 22A–22C illustrates one embodiment of the "dynamic multistrike" embodiment implemented on control module 16. After starting the routine, at 2100, it is confirmed that rpm is not above 3000 rpm, as in 2104. If rpm is above 3000 rpm, the application of multistrike function is inappropriate and, accordingly, microcontroller 20 does not make restrikes, as in 2120. Otherwise, microcontroller 20 determines if the restrikes flag is on or off, as in 2108. If off, the logic proceeds to the don't make restrikes block of 2120. The restrike flag disables this feature at appropriate times, such as when a rev limiter function is active.

Otherwise, the control module 16 computes the time TsubR required to make one restrike, as in 2112. In the exemplary computation in block 2112 corresponding to an exemplary high voltage circuit, control module 16 computes that a total of 1000 microseconds (700 microseconds for storing current on transformer 74 and 300 microseconds to charge the 1 microfarad capacitor through power transistors 72; see FIG. 2) are required to fully charge the 1 microfarad capacitor up to its 135 millijoule capacity when a constant 12.5 V battery source is applied (corresponding to X=127). In this example, the variable X corresponds to the digitized value of the battery voltage input to microcontroller 20. As the value of X decreases (corresponding to lower battery voltage) the total time to charge will increase since current will need to be applied to the primary side of power transformer 74 for a longer period. According to 2114, control module 16 determines the time left to make restrikes. This time will be equal to the allowed retard minus the timing retard, which corresponds to the restrike window/minimum advance parameter discussed above. Based on that computation and the computed time for a single restrike, block 2116 determines if there is time left for a restrike. If not, control module 16 doesn't make another restrike, as in 2120.

If there is time for a restrike (block 2116, "yes"), 2124 determines if there is enough time for one restrike. If not, no restrike is made, as in 2120. If yes, 2128 determines if the time available for restrikes is greater than 6 milliseconds. If yes, then 6 milliseconds is used as the time available for restrikes, as in 2136, so that the maximum number of restrikes is not exceeded. Otherwise, 2132 computes the number of restrikes that can be made. This may be computed by dividing the total time required (e.g., 1000 microseconds) into the time available (e.g., 6 milliseconds). According to block 2140, if more than five restrikes can be made, then 2148 provides that the maximum five restrikes is made.

According to 2144, control module 16 determines if 200 microseconds have passed since the trigger signal. The purpose of waiting 200 microseconds is to allow the capacitor to fully discharge and the ignition coil to stabilize before charging the capacitor again. If not, the process waits until 200 microseconds have passed, as indicated by the "no" loop from the output of 2144 back to its input. The end spark trigger is then enabled (i.e., the "end conduction signal" is sent) to end the discharge, as in 2152, and 2156 determines if the allowed restrikes have been made. If yes, the restrikes are ended, as in 2160.

If not, additional restrikes are needed, and 2164 provides for adding a restrike and reducing the time left for restrikes by 500 microseconds (time for the trigger and capacitor charging). Accordingly, the power transistors (block 72, FIG. 2) are turned on to power the transformer (block 74, FIG. 2) until it is time to end the power transistors on time, as in 2168. Three hundred microseconds are added in order to charge up the capacitor from transformer 74 through charge diodes 78 (both of FIG. 2), as in 2172. Once the capacitor is recharged (300 microseconds) ("yes" at 2176), the recharge ends and the start spark trigger enables to release the charge to the ignition coil, as in 2180. The process returns to the input to 2144, whereupon 2144, et al. are repeated to create additional resparks until the allowed restrikes have been made.

Launch Control Operation

Detailed aspects of the programming steps for implementing launch control for one embodiment of the invention are described in the Installation Instructions and Troubleshooting Manual (© 1999) published by Holley® Performance Products Inc., herein incorporated by reference. Launch control reduces the amount of horsepower upon leaving the "starting line" (or in non-racing contexts, any fast start from a stationary position) to avoid traction loss. Launch control can be implemented by programming a timing retard for a specified duration from start. In the highly flexible system disclosed herein, launch control is readily implemented by programming one of the timing retards (see, e.g., area 1820 of FIG. 19) to be enabled by one of the RPM switches, such as the high output switch H4 in area 1830 of FIG. 19.

Referring to FIG. 19, the user selects the value of timing retard to be applied in area 1820. High output RPM switch H4 in area 1830 will enable the timing retard using a time window based switching function such as the fourth switching function (U4) previously discussed. Although not shown on the workstation type display of FIG. 19, upon selecting switching "style" 4 for the High 4 output switch, entry cues for the first and second timer are provided. The user will set the first timer to zero and the second timer to the amount of time the launch retard will be active, for example, at 0.7 seconds.

The enable line to the fourth switching function may be operatively connected to the start or "staging" button a racer is engaging when staging at the beginning of a race. This provides that the programmed launch retard will activate only upon launch (i.e., just after staging). If a race car has a clutch, the launch control enable is generally connected to the clutch pedal. In a standard commercial vehicle with a clutch (and without a staging button, of course), the control module logic would provide the launch control to be activated when disengaging the clutch in first gear to move out but, of course, not in between each use of the clutch (i.e., launch control should not be activated when shifting between first and second, second and third, etc.). Finally, the programmable rpm window may be selected to further tailor the launch retard.

The principles, preferred embodiments and modes of operation of the presently disclosed ignition system has been described in the foregoing specification. The presently disclosed ignition system, however, is not to be construed as limited to the particular embodiment shown as this embodiment is regarded as illustrious rather than restrictive. Moreover, variations and changes may be made by those skilled in the art without departing from the spirit of the presently disclosed ignition system as set forth by the claims.

What is claimed is:

1. An ignition system for energizing an ignition coil of an internal combustion engine, comprising:
- a high voltage unit for energizing the ignition coil of the engine;
- a control unit with processor and memory for:
  - storing timing curve data comprising cylinder specific information;
  - receiving timing signals from one or more pickup devices;
  - causing the high voltage unit to energize the ignition coil based on said timing signals and said timing curve data; and means for programming the cylinder specific information in the control unit.

2. The ignition system of claim 1, wherein said means for programming comprise a remote programmer device.

3. The ignition system of claim 1, wherein said means for programming comprise a computer workstation.

4. The ignition system of claim 3, wherein said computer workstation provides a graphical user interface display for programming said timing curve data.

5. The ignition system of claim 1, wherein said timing signals comprise a first trigger signal and a second identification signal, said identification signal identifying a specific cylinder.

6. The ignition system of claim 1, wherein said cylinder specific information comprises timing adjustment data for each cylinder and said timing curve data further comprises a nominal curve.

7. The ignition system of claim 6, wherein said timing adjustment data for each cylinder is fixed as a function of engine speed.

8. The ignition system of claim 6, wherein said timing adjustment data for each cylinder is permitted to vary as a function of engine speed.

9. The ignition system of claim 1, wherein the ignition coil is coupled to a distributor for routing a spark to the proper cylinder.

10. The ignition system of claim 1, further comprising means to adjust said cylinder specific information based on feedback data.

11. The ignition system of claim 1, wherein said control unit has at least one programmable retard operator, and wherein said means for programming is further adapted to program said retard operator to implement launch control.

12. The ignition system of claim 11, wherein said means for programming is further adapted to couple said retard operator to a switching operator whereby a user can program at least one time duration for controlling when said launch control is enabled.

13. An capacitive discharge ignition system for energizing an ignition coil of an internal combustion engine, comprising:

a high voltage unit for energizing the ignition coil of the engine; and a control unit with processor and memory for:

storing timing curve data;

receiving timing signals from one or more pickup devices;

causing the high voltage unit to energize the ignition coil based on said timing signals and said timing curve data; and creating multiple sparks during low engine speed operation based on battery voltage data and capacitor timing data.

14. The ignition system of claim 13, wherein the number of multiple sparks generated for a given cylinder firing is capable of varying as a function of engine speed.

15. A process for providing cylinder specific timing in a capacitive discharge digital ignition system, comprising:

providing a high voltage unit for energizing the ignition coil of the engine;

providing a control unit having a processor and memory, said control unit adapted to (a) store timing curve data comprising cylinder specific information; (b) receive timing signals from one or more pickup devices; and (c) cause the high voltage unit to energize the ignition coil based on said timing signals and said timing curve data; and programming said control unit to effectuate ignition timing based on the identity of the firing cylinder.

16. The process of claim 15, wherein said step of programming is performed using a remote programmer device.

17. The process of claim 15, wherein said step of programming is performed using a computer workstation.

18. The process of claim 15, wherein said timing signals comprise a first trigger signal and a second identification signal, said identification signal identifying a specific cylinder.

19. The process of claim 15, wherein said timing curve data comprises a nominal curve and a plurality of cylinder specific curves corresponding to the cylinders.

20. The process of claim 15, wherein said cylinder specific information is constant as a function of engine speed.

21. The process of claim 15, wherein said cylinder specific information can vary as a function of engine speed.

22. The process of claim 15, wherein said control unit is further adapted to cause the high voltage unit to energize the ignition coil based on feedback data to compute a modified timing value to be applied when generating a spark.

23. The process of claim 15, wherein said control unit has at least one retard operator programmable to implement launch control.

24. The process of claim 23, wherein said retard operator can be programmed according to at least one time duration for controlling when said launch control is enabled.

* * * * *